US008336826B2

(12) United States Patent
Janson

(10) Patent No.: US 8,336,826 B2
(45) Date of Patent: Dec. 25, 2012

(54) PROPULSION SYSTEMS AND METHODS UTILIZING SMART PROPELLANT

(75) Inventor: Siegfried W. Janson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 33 days.

(21) Appl. No.: 12/847,988

(22) Filed: Jul. 30, 2010

(65) Prior Publication Data

US 2012/0023948 A1     Feb. 2, 2012

(51) Int. Cl.
*B64G 1/40* (2006.01)
(52) U.S. Cl. .................. 244/171.1; 244/172; 244/158 R
(58) Field of Classification Search .................. 335/219; 244/171.1, 158 R, 172, 63
See application file for complete search history.

(56) References Cited

U.S. PATENT DOCUMENTS

| 4,432,333 | A | * | 2/1984 | Kurherr | 124/3 |
| 5,168,118 | A | * | 12/1992 | Schroeder | 89/8 |
| 5,178,347 | A | * | 1/1993 | Johnson et al. | 244/158.5 |
| 5,305,974 | A | * | 4/1994 | Willis | 244/171.5 |
| 6,142,424 | A | * | 11/2000 | Wagner | 244/158.5 |
| 6,830,221 | B1 | * | 12/2004 | Janson et al. | 244/158.1 |
| 6,994,296 | B2 | * | 2/2006 | Schubert | 244/171.5 |
| 7,013,988 | B2 | * | 3/2006 | Westmeyer et al. | 175/19 |
| 7,549,365 | B2 | * | 6/2009 | Root, Jr. | 89/1.819 |

OTHER PUBLICATIONS

Deis, D.W., Scherbarth, D.W., and Ferrentino, G.L., "EMACK Electromagnetic Launcher Commissioning," *IEEE Transactions on Magnetics*, vol. 20, No. 2 (Mar. 1984), pp. 245-248.

Corazzini, T, Robertson, A, Adams, J.C., Hassibi, A., and How, J.P., "GPS Sensing for Spacecraft Formation Flying," Institute of Navigation GPS-97, Kansas City, Missouri (Sep. 1997).
Pearson, J., Carroll, J., Levin, E., Oldson, J., and Hausgen, P., "Overview of the ElectroDynamic Delivery Express (EDDE)," AIAA Paper 2003-4790, 39th AIAA/ASME/SAE/ASEE Joint Propulsion Conference and Exhibit, Huntsville, AL (Jul. 20-23, 2003).
Hammer, J.H., "Mass Streams for Spacecraft Propulsion and Energy Generation," *Journal of Propulsion and Power*, vol. 22, No. 5 (Sep.-Oct. 2006), pp. 1111-1116.
Boaquan, K., Liyi, L., and Chengming, Z., "Analysis and Optimization of Thrust Characteristics of Tubular Linear Electromagnetic Launcher for Space-Use," *IEEE Transactions on Magnetics*, vol. 45, No. 1 (Jan. 2009), pp. 250-255.
Sarda, K., Grant, C., Eagleson, S., Kekez, D.D., Shah, A., and Zee, R.E., "Canadian Advanced Nanospace Experiment 2 Orbit Operations: One Year of Pushing the Nanosatellite Performance Envelope," SSC09-IV-6, *Proceedings of the 23nd Annual AIAA/USU Conference on Small Satellites*, Logan, UT, USA (Aug. 10-13, 2009), pp. 1-19.

\* cited by examiner

*Primary Examiner* — Christopher P Ellis
*Assistant Examiner* — Medhat Badawi
(74) *Attorney, Agent, or Firm* — Henricks, Slavin & Holmes LLP

(57) ABSTRACT

Propulsion systems and methods utilize one or more propellant masses in the form of smart propellant devices to move a spacecraft or other object through outer space and/or substantially airless environments. A spacecraft maneuver, for example, is facilitated by forces imparted on the spacecraft resulting from the ejection of one or more smart propellant devices from the spacecraft and/or the recapture of one or more of the propellant masses at the spacecraft. The smart propellant devices are each programmed to return to the spacecraft along a particular trajectory and to impact the spacecraft at a particular time and place. The spacecraft is provided with ejection devices and recovery devices that eject and recover, respectively, the one or more smart propellant devices. The recovery devices can also be configured to capture kinetic energy from incoming smart propellant devices.

77 Claims, 19 Drawing Sheets

Smart propellant device

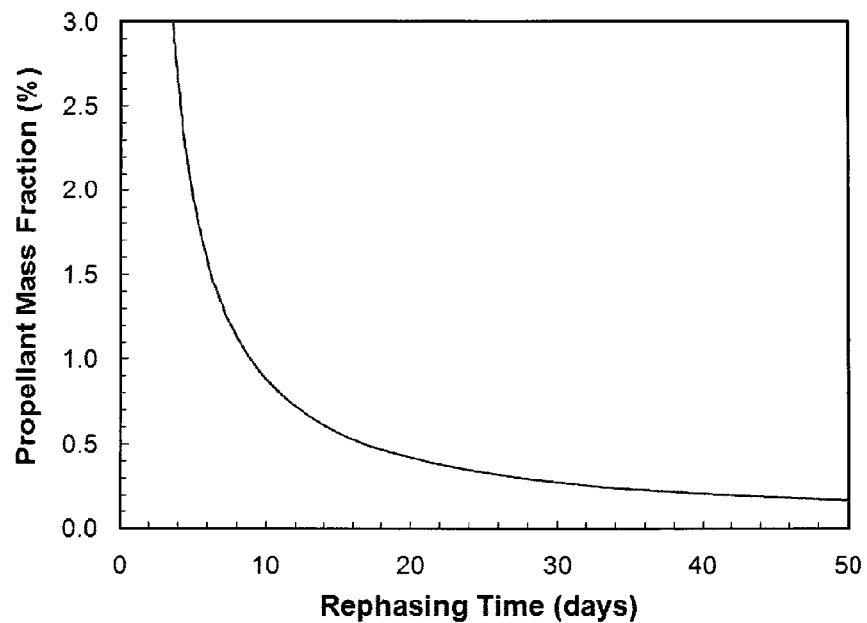
FIG. 8
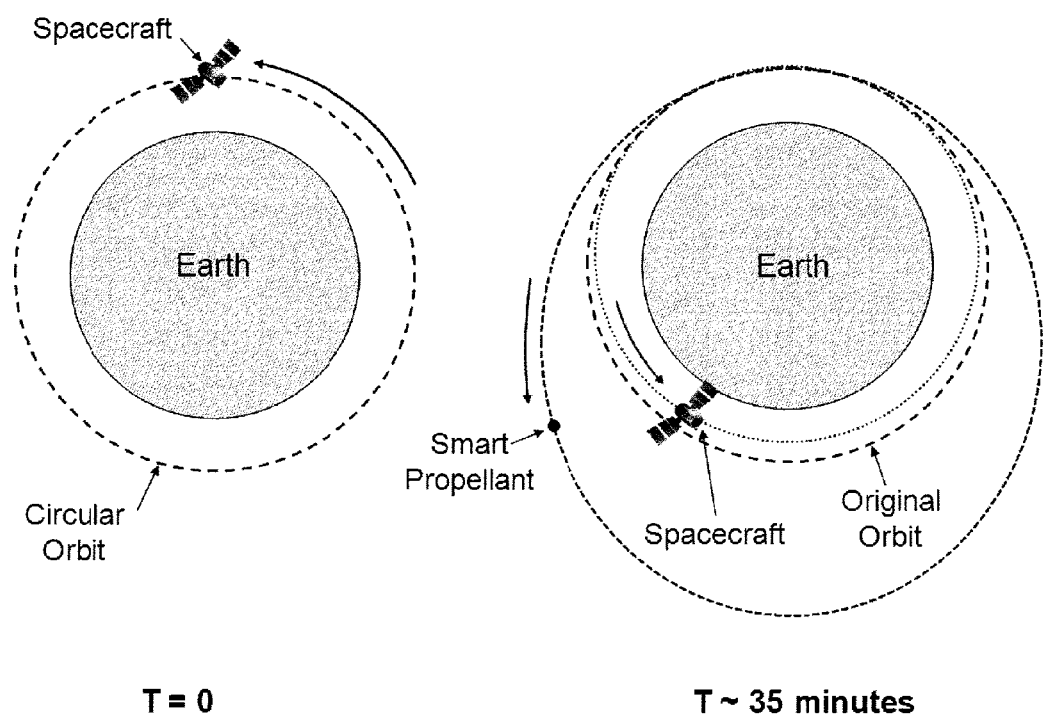
T = 0
FIG. 9A
T ~ 35 minutes
FIG. 9B

Eject smart propellant

Wait for propellant to return

Recapture propellant

Initial State Ejection Landing

Post-Liftoff Post-Impact

Ejection

Initial 400-km circular orbit ————
Orbit after smart propellant ejection - - - - - - - -

Approaching smart propellant apogee burn

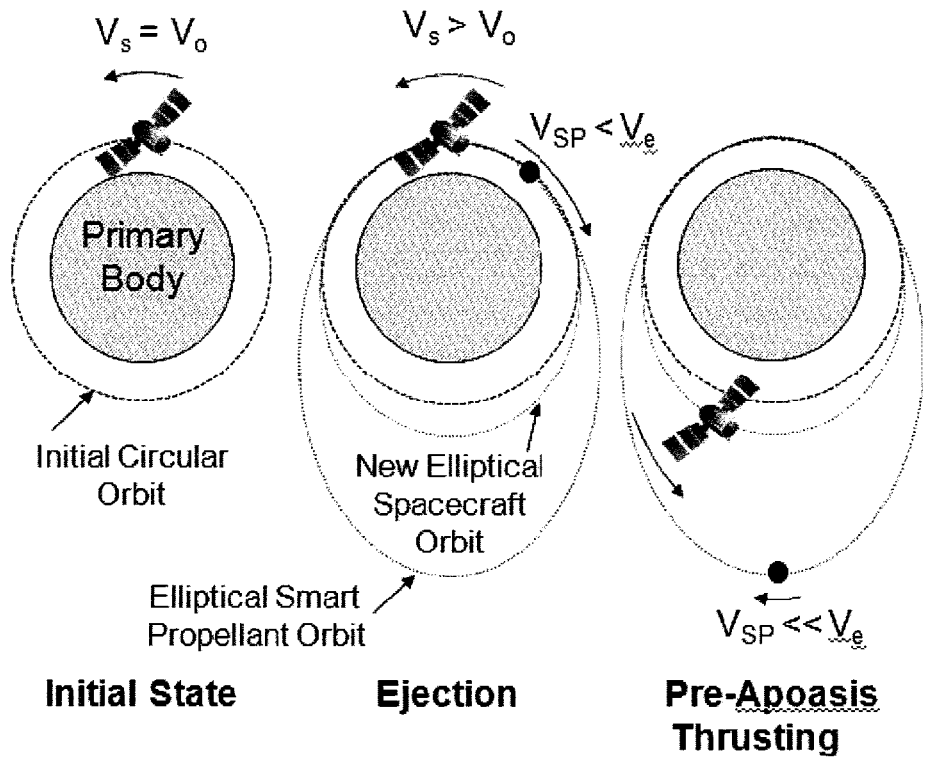
Initial State  
*FIG. 20A*
Ejection  
*FIG. 20B*
Pre-Apoasis Thrusting  
*FIG. 20C*
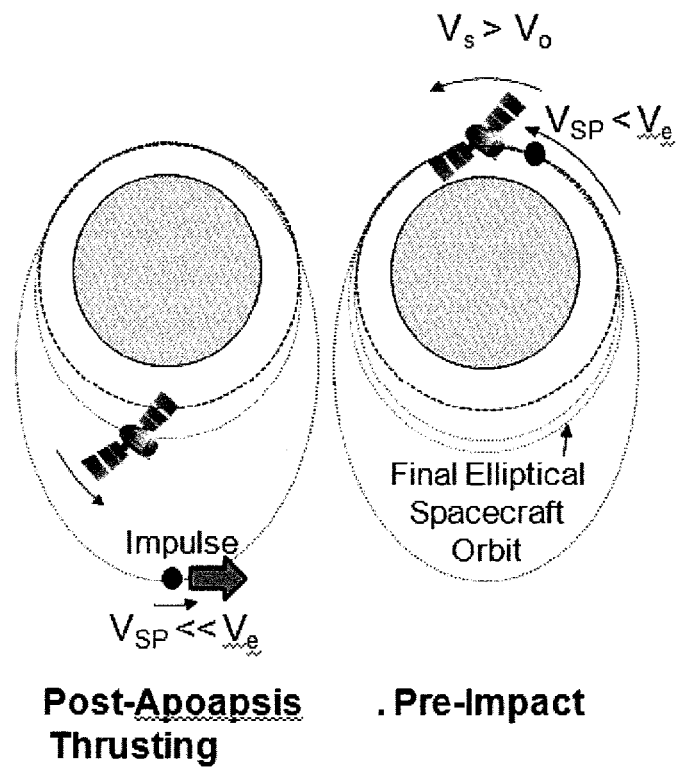
Post-Apoapsis Thrusting  
*FIG. 20D*
Pre-Impact  
*FIG. 20E*

Smart propellant
ejection phase

Smart propellant
recovery phase

Post-recovery

Smart propellant
ejection phase

Smart propellant
recovery phase

Post-ejection

PROPULSION SYSTEMS AND METHODS UTILIZING SMART PROPELLANT

TECHNICAL FIELD

The invention relates generally to the propulsion of objects in outer space or other airless environments and, in particular, to propulsion systems and methods in which a maneuver for a spacecraft (or other space-going object) is facilitated by forces imparted on the spacecraft resulting from ejecting one or more propellant masses from the spacecraft and/or recovering one or more of the propellant masses at the spacecraft.

BACKGROUND ART

Rocket propulsion is based on the high-speed ejection of propellant mass. Propellant mass, once ejected, does not return and the total mass of the spacecraft plus propellant decreases with each propulsive maneuver. The change in spacecraft velocity $\Delta V$ (delta-V) is a function of how much propellant mass $M_p$ was ejected, and the exit speed of that mass with respect to the spacecraft. The rocket equation, given by:

$$\Delta V = g_o I_{sp} \ln(M_i/M_f) \quad (1)$$

relates the change in spacecraft velocity to the specific impulse $I_{sp}$ and the change in total spacecraft mass from an initial $M_i$ to a final $M_f$. Ejected propellant mass $M_p$ is the difference between $M_i$ and $M_f$, $g_o$ is the gravitational acceleration constant at the Earth's surface (9.8 meter/s2), and $I_{sp}$ is the ratio of thrust divided by the mass flow rate. FIG. 1 shows propellant mass fractions $M_p/M_i$, calculated using Eq. 1, required to reach various velocity increments for several values of specific impulse. The curves are representative of cold gas thrusters (~50-s), small solid rockets or hydrazine thrusters (~200-s), bipropellant thrusters (~300-s), hydrogen/oxygen thrusters (~450-s), hot hydrogen thrusters (~900-s), and ion thrusters (~3000-s).

Cold gas thrusters are the simplest, but are useful for velocity increments below about 300-m/s. Chemical thrusters with specific impulse between 200-s and 450-s are more complex, but they enable significantly lower propellant mass fractions. Chemical thrusters have been the primary workhorses of the Space Age; they regularly launch spacecraft into orbit and have propelled space probes beyond Pluto's orbit. Nuclear and solar thrusters can provide a 900-s $I_{sp}$ with hydrogen propellant, but these have only been demonstrated in ground tests. Electric thrusters top the specific impulse range, but these are typically low-thrust (less than 1–N) devices.

The main reason electric thrusters provide low thrust is that the power required to produce a Newton of thrust increases proportionally with specific impulse. The combination ($g_o I_{sp}$) is the directed exit speed $V_e$ of the propellant mass; a 200-s $I_{sp}$ thruster, for example, has a directed exit speed of 2.0-km/s while a 3000-s thruster has a directed exit speed of 30-km/s. The kinetic power $P_{KE}$ required to maintain the exhaust plume is proportional to the mass flow rate dm/dt and the square of the directed exit speed $V_e$:

$$P_{KE} = \tfrac{1}{2} dm/dt V_e^2. \quad (2)$$

Because thrust T is proportional to mass flow rate times velocity, $$T = dm/dt V_e, \quad (3)$$

the power per unit thrust is proportional to $V_e$, and thus, specific impulse $I_{sp}$.

FIG. 2 shows the power required to generate a Newton of thrust as a function of specific impulse, and the energy density of the propellant in the exhaust stream, assuming complete conversion of input power into directed plume power. Cold gas thrusters utilize propellant thermal energy densities at typical spacecraft temperatures that range from a few tenths to ~2-MJ/kg. Chemical thrusters use propellants with chemical potential energy densities up to a few tens of MJ/kg. To achieve specific impulses beyond 500-s, the addition of external energy (e.g., thermal or electric power from solar cells or nuclear reactors) to the propellant stream is currently required. Nuclear fuels have potential energy densities that are about a million times higher than chemical propellants, up to tens of TJ/kg. If these could be used directly as propellants, high thrust at 500,000-s $I_{sp}$ or higher would be possible. Presently, however, it is still necessary to rely on low thrust electric propulsion for $I_{sp}$ above 1000-s.

FIG. 2 shows that a megawatt of chemical power is generated by a kilonewton thruster (enough to barely lift the mass of a typical adult male human at the Earth's surface) at 200-s $I_{sp}$. The U.S. Space Shuttle solid rocket motors generate 30 gigawatts of power to generate a total thrust of 25-MN at 242-s $I_{sp}$, which is equivalent to the average instantaneous electrical power usage for the entire state of California.

A significant propulsion challenge is to land humans or equipment on the moon and return them to Earth. The velocity increment for this mission about 11,500 m/sec. This is a very large velocity increment for an in-space mission.

Sending a spacecraft to geosynchronous Earth orbit (GEO) from an initial 400 km circular low Earth orbit (LEO) has a minimum propellant mass fraction of 83% using 220 sec $I_{sp}$ thrusters and 59% using 440 sec $I_{sp}$ thrusters.

For the 400 km LEO to moon landing and return scenario with a $\Delta V$ of 11,500 msec, the propellant mass fraction is 93% using the best chemical thruster $I_{sp}$ of 440 sec. The only way to accomplish this mission using chemical thrusters is to use multiple stages and throw away unneeded mass such as empty propellant tanks whenever possible. The Apollo moon landings of the late 1960s and early 1970s, for example, started with 118,000 kg in a LEO parking orbit and put 47,000 kg in low lunar orbit using a 400 sec $I_{sp}$ thruster. The remaining maneuvers used space-storable propellants with a reduced $I_{sp}$ of 315 sec. The mission ended with a 5800 kg capsule entering Earth's atmosphere at near escape velocity. Less than 5% of the original mass in LEO was returned.

Dramatic reductions in required propellant mass occur as $I_{sp}$ is increased. Unfortunately, electric thrusters are required to attain higher $I_{sp}$, and the input energy requirements, for constant thrust, scale with $I_{sp}$. This is why electric thrusters with high $I_{sp}$ generally have low thrust levels. A 1000 N (224 lb-force) thruster, for example, would require 30 MW of electric power at 5000 sec $I_{sp}$, and 60 MW at 10,000 sec $I_{sp}$. As $I_{sp}$ increases, the propellant mass savings is eliminated at some point by an increasing mass of the power supply.

It would be useful to be able to provide a spacecraft propulsion technology in which the amount of propellant mass required (e.g., to facilitate a particular spacecraft maneuver) is reduced. It would also be useful to be able to provide a spacecraft propulsion technology in which propellant mass and/or energy is used more efficiently.

It would be useful to be able to provide propulsion systems and methods that are more mass and/or energy efficient than conventional spacecraft propulsion technologies.

It would be useful to be able to continually use or reuse, rather than discard, expensive spacecraft components.

SUMMARY OF THE INVENTION

Example embodiments described herein include propulsion methods and systems that utilize one or more processor-controlled propellant masses ("smart propellant devices") and, in some instances, controlled ejection velocities and orbital mechanics to return propellant mass back to the spacecraft for reuse. In example embodiments, each smart propellant device controls its own trajectory, in returning to the spacecraft, and can additionally facilitate a spacecraft maneuver by imparting a force upon the spacecraft at the time the smart propellant device impacts and is recovered by the spacecraft. These individual smart propellant devices can be spacecraft (pico- or nanospacecraft, for example) with navigation determination, attitude determination and control, and thruster/propulsion systems to facilitate return to the host spacecraft. In example embodiments in which the ejected smart propellant device returns to the spacecraft and is recaptured, the smart propellant device, less any on-board propellant mass expended for trajectory modification, can be reused again and again. In example propulsion methods and systems, the smart propellant devices essentially function as recyclable momentum transfer agents.

Smart propellant devices, in conjunction with ejection and recovery devices provided at the spacecraft, facilitate a reuseable in-space transportation architecture that emphasizes recycling of propellant mass. By returning propellant mass to the spacecraft after ejection and subsequently recycling the recovered propellant mass, many of the limitations of the rocket equation can be overcome providing, for example, a significant increase in mass delivered to a target destination or orbit. A reduction in the amount of propellant mass required for a given maneuver, mission, etc. (hereafter "maneuver") increases the effective $I_{sp}$, potentially, in some instances, making expensive spacecraft available for continual reuse. Moreover, in some circumstances, the need for very high $I_{sp}$ is eliminated or reduced, allowing higher average thrust levels to be maintained with significantly reduced power consumption.

In example embodiments of the propulsion methods and systems described herein, the need for an Earth-based ejection device (e.g., accelerator) is eliminated, and all of the initial propellant mass is placed onboard the host spacecraft as well as initially ejected from the spacecraft. In an example embodiment, a spacecraft maneuver is facilitated exclusively utilizing smart propellant devices that are initially ejected from the spacecraft. In an example embodiment, a spacecraft maneuver is facilitated without utilizing any forces imparted upon the spacecraft resulting from recovering, or recovering and ejecting, a propellant mass that was initially ejected or launched from a location other than the spacecraft (e.g., from Earth, a moon, or some established interplanetary infrastructure launch situs).

Spacecraft maneuvers facilitated by the propulsion methods and systems described herein include, for example, orbit rephasing, orbit raising and lowering, and landing (plus subsequent take-off, e.g., electric-powered liftoff from a lunar surface) from airless or substantially airless bodies. Required smart propellant ejection velocities range from tens of meters per second for rephasing to ten's of kilometers per second for orbit raising in low Earth orbit.

Additionally, methods and systems utilizing smart propellant-based technology, in example embodiments, provide propulsion with even higher effective $I_{sp}$ by using more modest power levels (in some instances, in conjunction still with high-thrust maneuvering when required).

Potential uses for the propulsion methods and systems described herein include mass-produced smart propellant devices (e.g., tens of thousands of nano-, pico-, or possibly even femtospacecraft), which serve as components of a transportation architecture facilitating human and robotic exploration of the moon, Mars, and beyond.

In an example embodiment, a propulsion method includes: ejecting a smart propellant device from a spacecraft resulting in an ejection force being imparted to the spacecraft; and controlling the smart propellant device to return to the spacecraft.

In an example embodiment, a propulsion method includes: ejecting a plurality of smart propellant devices from a spacecraft resulting in one or more ejection forces being imparted to the spacecraft; and controlling the smart propellant devices to return to the spacecraft.

In an example embodiment, a propulsion system includes: one or more smart propellant devices; and one or more ejection devices on a spacecraft that are configured to eject the one or more smart propellant devices from the spacecraft; wherein the one or more smart propellant devices each include a housing, a processor within the housing, a position determination device that generates position information, and one or more thrusters configured to receive control commands from the processor, the processor for each of the one or more smart propellant devices being programmed to control movement of the smart propellant device after the smart propellant device has been ejected from the spacecraft and return the smart propellant device to the spacecraft.

In an example embodiment, a propulsion method includes: (a) ejecting one or more smart propellant devices from a spacecraft; (b) controlling the one or more smart propellant devices to return at least one of the one or more smart propellant devices to the spacecraft; (c) recovering one or more returning smart propellant devices; and (d) repeating (a)-(c) until forces resulting from (a) and (c), that in the aggregate facilitate a maneuver of the spacecraft, have been imparted to the spacecraft, or until the maneuver is completed or aborted.

BRIEF DESCRIPTION OF THE DRAWINGS

FIG. 8 is a plot showing the propellant mass fraction required to rephase a satellite in a 700-km altitude circular orbit by 180° using a 220-s $I_{sp}$ thruster;

FIGS. 9A and 9B show spacecraft and smart propellant orbits before and after smart propellant ejection in an Earth-centered inertial frame, respectively;

FIGS. 20A-20E show the trajectory evolution of an example orbit raising maneuver;

DISCLOSURE OF INVENTION

Figure 1:
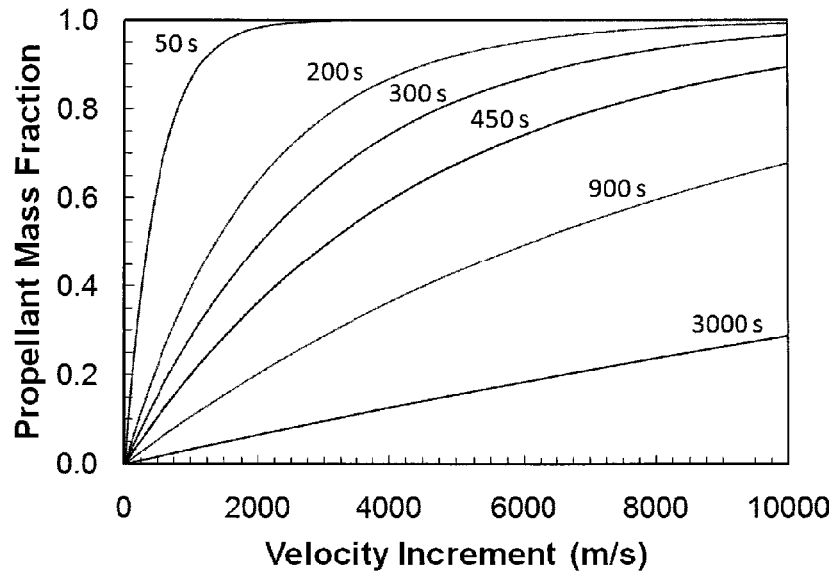
FIG. 1 is a plot showing Propellant Mass fractions vs. velocity increment for representative specific impulses.
Figure 2:
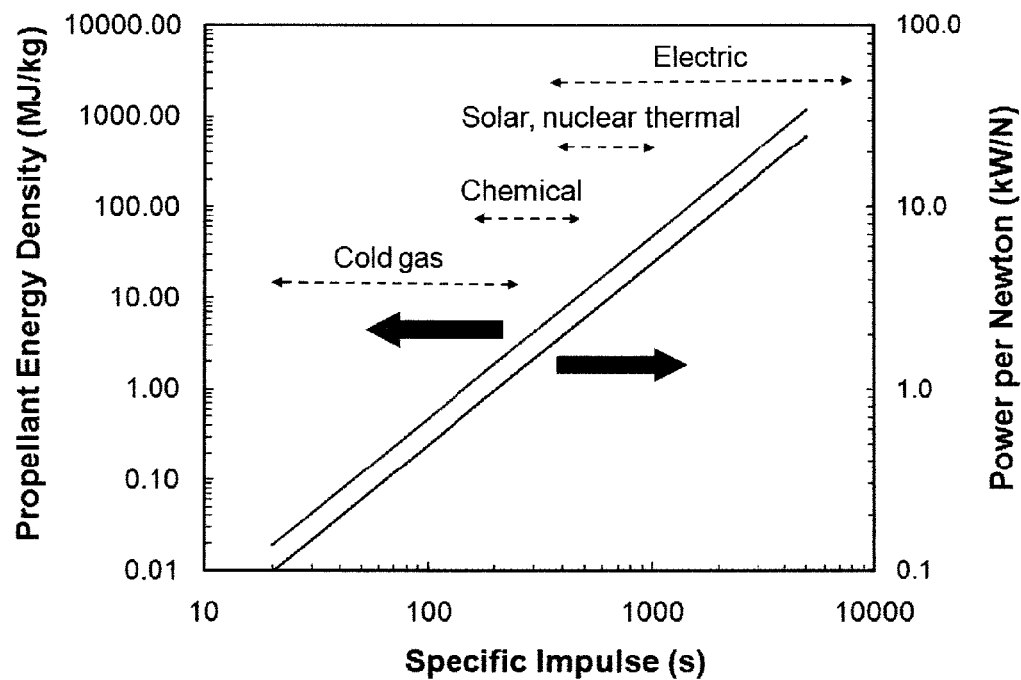
FIG. 2 is a plot showing Propellant energy density and power per Newton for ideal thrusters as a function of $I_{sp}$.
Figure 3A:
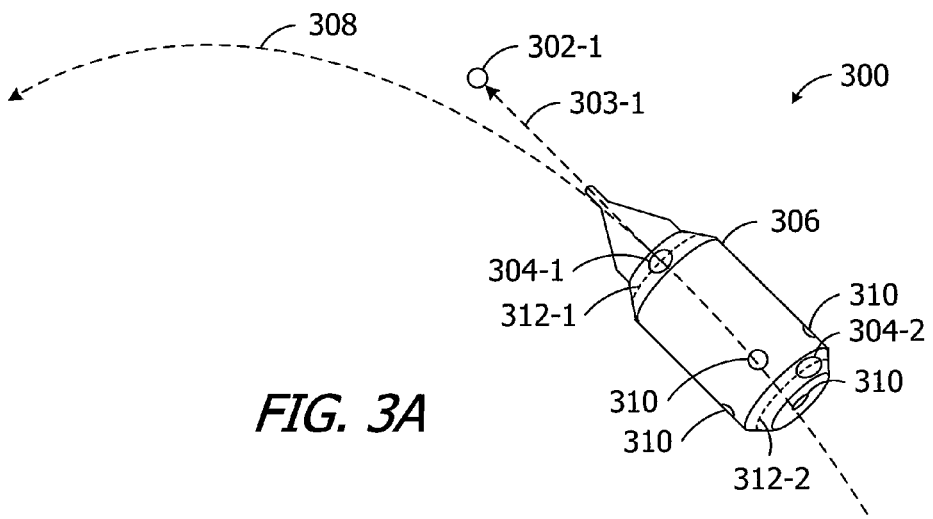
FIGS. 3A and 3B show an example embodiment of a propulsion system for a spacecraft, shown in operation ejecting smart propellant devices at different times as the spacecraft moves along a flight trajectory.
Figure 3B:
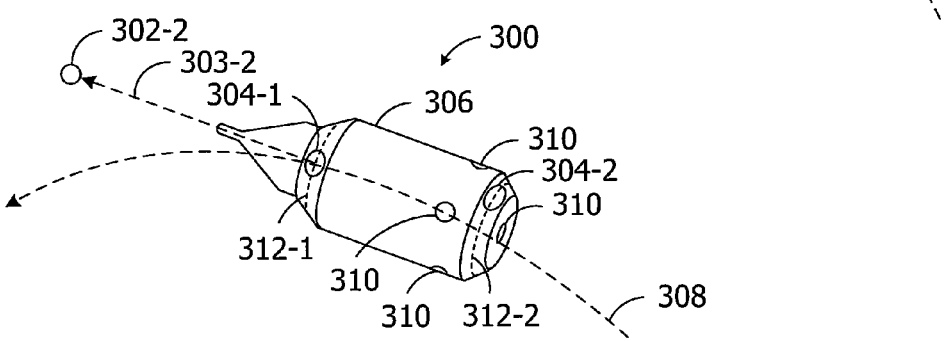

Referring to FIGS. 3A and 3B, in an example embodiment, a propulsion system 300 includes one or more processor-controlled propellant masses (e.g., smart propellant devices 302-1 and 302-2) and one or more ejection devices (e.g., ejection and recovery systems 304-1 and 304-2) on a spacecraft 306. In this example, the spacecraft 306 is shown moving along a trajectory 308 (shown by a dashed line). The one or more ejection devices are configured to eject (e.g., accelerate) the one or more smart propellant devices from the spacecraft 306 to facilitate a maneuver of the spacecraft 306. In this example, as shown in FIGS. 3A and 3B, the smart propellant devices 302-1 and 302-2 are ejected from the same ejection device (e.g., the ejection and recovery system 304-1), but at different times, along trajectories 303-1 and 303-2 (shown in dashed lines), respectively. Alternatively, multiple different ejection devices (e.g., ejection and recovery systems 304-1 and 304-2) can be used to eject the one or more smart propellant devices in a manner appropriate (e.g., simultaneously, sequentially, or otherwise) to facilitate the maneuver. In this example embodiment, the spacecraft 306 includes on-board propulsion devices 310 (e.g., thrusters), which are arranged on the spacecraft 306 and configured for operation taking into consideration criteria including, for example, mission requirements and contributions to propulsion that will be made by one or more smart propellant devices. It should be appreciated that the illustrated arrangement of on-board propulsion devices 310 is merely representative and that the propulsion requirements of particular system implementations typically vary. As shown in FIGS. 3A and 3B, the spacecraft 306 also includes rails 312-1 and 312-2 (shown in dashed lines) and associated mechanisms (not shown) for repositioning the ejection and recovery systems 304-1 and 304-2, respectively, about the exterior of the spacecraft 306.

Figure 4:
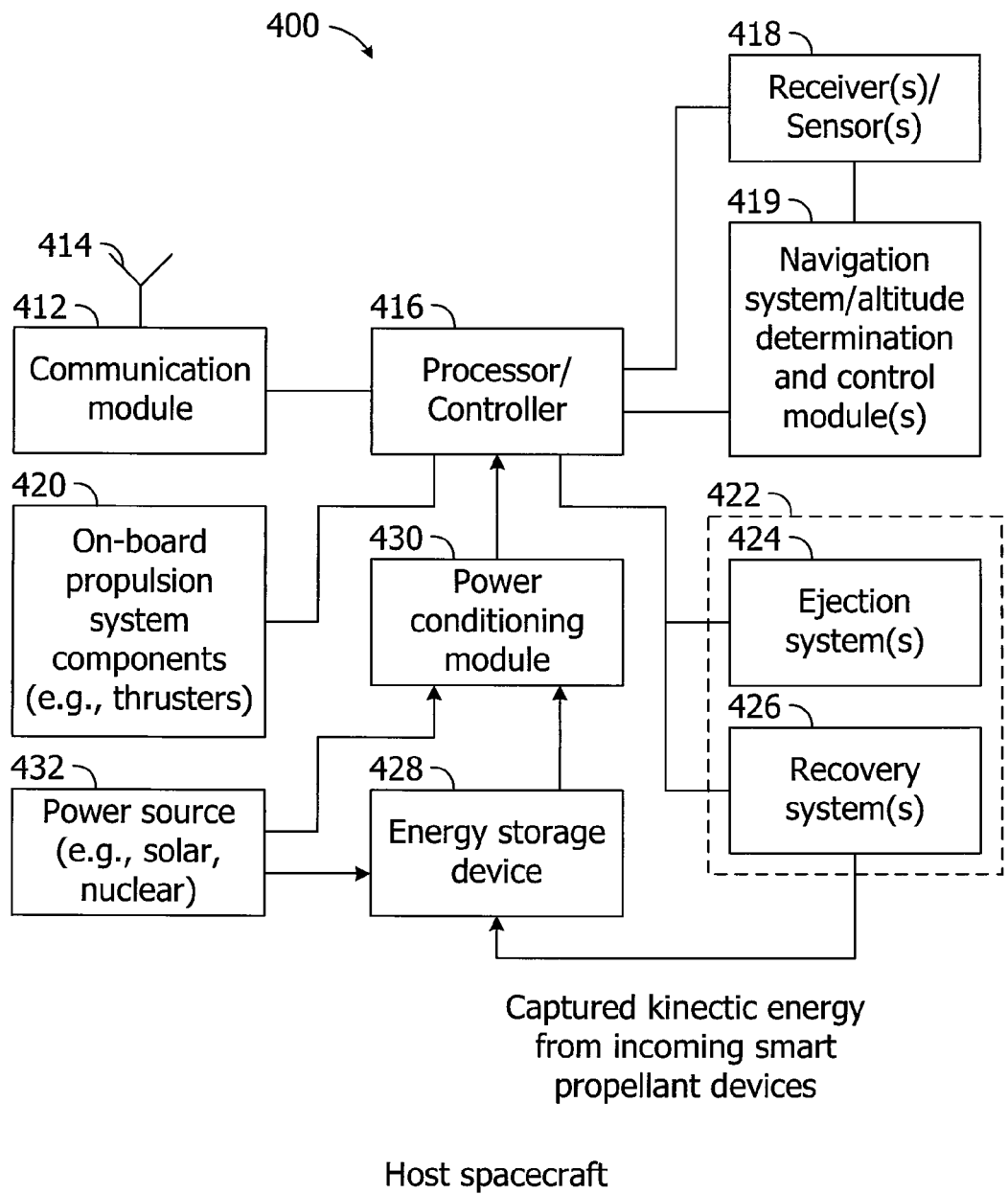
FIG. 4 is a system diagram of an example host spacecraft.

Referring FIG. 4, in an example embodiment, a host spacecraft 400 includes a communication module (or subsystem) 412 and an antenna (or multiple antennas) 414, which allow the spacecraft 400 to establish communication links with other wireless communications devices. The communication module 412 includes, for example, receivers and transmitters (e.g., a transceiver) and a communications interface devices (e.g., radio modems). The communication module 412 allows the spacecraft 400 to receive information transmitted by the smart propellant devices, or from other sources, and to broadcast information to the smart propellant devices. Information received by the communications module 412 is provided to the processor/controller 416, which is programmed to control the spacecraft 400 and its various subsystems.

In this example embodiment, the spacecraft 400 includes receiver(s)/sensor(s) 418 (e.g., Global Positioning System or "GPS" receivers and optical sensors) and navigation system/altitude determination and control module(s) 419, which interface with each other and the processor/controller 416. By way of example, the receiver(s)/sensor(s) 418 and navigation system/altitude determination and control module(s) 419 are configured to function as a position determination device that generates position information pertaining to the location of the spacecraft 400.

In this example embodiment, the spacecraft 400 also includes on-board propulsion system components 420 (e.g., thrusters). It should be appreciated, however, that the scope of the present invention additionally contemplates alternative embodiments in which a spacecraft or other space-going object is not provided with on-board propulsion, but rather relies for purposes of propulsion exclusively upon forces imparted to the spacecraft by ejection and/or recovery of smart propellant devices.

The spacecraft 400 includes one or more devices for ejecting one or more smart propellant devices ("ejection device(s)") and also, in various embodiments, one or more devices for recovering one or more smart propellant devices ("recovery device(s)"). In this example embodiment, the spacecraft 400 includes an ejection and recovery system 422 that includes an ejection system(s) 424 and a recovery system(s) 426, which can, but do not necessarily, share common components. In an example embodiment, one or more ejection devices and one or more recovery devices share common components.

The ejection and recovery system 422 can include one or more of mechanical, pneumatic, and electromagnetic devices. For example, a "mechanical" ejection and recovery system 422 can be based on a compressed spring and a latching device, e.g., as used with CubeSats to provide a mechanical ejection system. Such springs can be increased in stiffness and length to provide ejection velocities up to ~50-m/s. In this case, a 1-m long spring requires a spring constant of about 8,700 N/m (600 lbf/ft). For a 50-m/s ejection velocity and 1-meter long spring, the acceleration (or deceleration) is 255-g's and the acceleration (or deceleration) time is a mere 31-ms. Over 30 can be launched (or retrieved) in a second. A 100-kg mass spacecraft ejecting (or retrieving) a 3.5-kg mass smart propellant units would experience a maximum instantaneous acceleration of 8.9-g's. To minimize instantaneous g-loads on the host spacecraft, smart propellant would ideally be broken down into the lightest possible units that can be launched sequentially. In such a "mechanical" ejection and recovery system 422, prior to ejection of a smart propellant device, the spring is compressed and secured (e.g., mechanically latched) in place to capture the strain energy. The compressive force of a returning smart propellant device can also be used to compress the spring. An electric motor and drive system can also be used to further compress the spring, or readjust compression to set the correct next ejection velocity.

By way of additional example, an "electrical" ejection and recovery system 422 can be based on an electromagnetic accelerator/decelerator or similar device. Higher velocities can be achieved using electromagnetic accelerators. These devices are essentially linear electric motors that use switched currents to generate moving magnetic fields that accelerate either a magnetic or electrically conductive object at accelerations up to several hundred thousand g's. Typical accelerations are in the several hundred to several thousand g range. In the case of electrically conductive objects, Eddy currents generated within the object generate magnetic fields that oppose the applied fields. See, e.g., Pearson, J., Carroll, J., Levin, E., Oldson, J., and Hausgen, P., "Overview of the ElectroDynamic Delivery Express (EDDE)," AIAA Paper 2003-4790, 39th AIAA/ASME/SAE/ASEE Joint Propulsion Conference and Exhibit, Huntsville, Ala. (Jul. 20-23, 2003); Hammer, J. H., "Mass Streams for Spacecraft Propulsion and Energy Generation," *Journal of Propulsion and Power*, Vol. 22, No. 5 (September-October 2006), pp. 1111-1116; and U.S. Pat. No. 5,305,974 (Willis) issued on Apr. 26, 1994, which are hereby incorporated by reference.

It is additionally contemplated that example embodiments of the ejection and recovery system 422 can include railguns, or electromagnetic accelerators such as the tubular linear electromagnetic launcher. See, e.g., Deis, D. W., Scherbarth, D. W., and Ferrentino, G. L., "EMACK Electromagnetic Launcher Commissioning," *IEEE Transactions on Magnetics*, Vol. 20, No. 2 (March 1984), pp. 245-248; and Boaquan, K., Liyi, L., and Chengming, Z., "Analysis and Optimization of Thrust Characteristics of Tubular Linear Electromagnetic Launcher for Space-Use," *IEEE Transactions on Magnetics*, Vol. 45, No. 1 (January 2009), pp. 250-255, which are hereby incorporated by reference.

The ejection device(s) and recovery device(s) can be provided separately, or as components of a multifunctional device. Regardless, in various example embodiments, the ejection device(s) and recovery device(s) are configured to operate together. By way of example, a communication link is established between a recovered smart propellant device and the processor/controller 416, which can be used to transfer collected data and other information, and also to re-program the smart propellant device for its next mission. The recovered smart propellant device may also require replenishment of fuel, recharging of energy storage devices, software updates, or repairs to damaged components, in which case, depending upon the particular configurations of the ejection and recovery system 422 and other subsystems of the spacecraft 400, the requirements and state of progress of relevant maneuver(s), and possibly other inputs (e.g., operator commands), the recovered smart propellant device may be moved to another location, e.g., utilizing shuttle or other mechanisms (not shown), for service/updates/repairs. Thus, in example embodiments, the ejection and recovery system 422 includes and/or is configured for operation with shuttle or other mechanisms that can be used to move the one or more smart propellant device to one or more locations (e.g., from a recovery device to an ejection device). Information transferred between the recovered smart propellant device and the spacecraft can used to determine which of multiple recovered smart propellant devices should be designated suitable for reuse (and, if appropriate, returned an ejection device) and which are no longer suitable for ejection or need to be "recycled" (or "refurbished") in some other manner.

In an example embodiment, the one or more ejection devices are configured to accelerate the one or more smart propellant devices to launch the one or more smart propellant devices from the spacecraft. In an example embodiment, the one or more ejection devices are configured to eject the one or more smart propellant devices at one or more velocities that cause at least one of the one or more smart propellant devices and the spacecraft to subsequently be in the same place at the same time. In an example embodiment, the one or more ejection devices are configured to re-eject the one or more smart propellant devices that were recovered resulting in one or more additional ejection forces being imparted to the spacecraft.

In an example embodiment, the propulsion system includes one or more recovery devices on the spacecraft that are configured to recover the one or more smart propellant devices as they return to the spacecraft. In an example embodiment, the one or more recovery devices are configured to decelerate the one or more smart propellant devices as the one or more smart propellant devices impact the spacecraft. In an example embodiment, the one or more recovery devices are configured to re-recover the one or more returning smart propellant devices at the spacecraft resulting in one or more additional recovery forces being imparted to the spacecraft.

Referring again to FIG. 4, in this example embodiment, the ejection and recovery system 422 is configured to reversibly extract and store energy from the incoming propellant. In an example embodiment, a propulsion system includes one or more recovery devices (e.g., the recovery system(s) 426) are configured to capture the incoming kinetic energy of the one or more smart propellant devices. To facilitate kinetic energy recovery, the one or more recovery devices include, for example, a spring and a mechanically-operated power generator, which is operationally engaged in response to compression of the spring. The one or more recovery devices also include, for example, one or more latching devices for securing the spring (e.g., in a desired state of compression) and for stabilizing and securing a recovered smart propellant device in position. Alternatively, or additionally, the one or more recovery devices include an electromagnetic device (e.g., an electromagnetic accelerator/decelerator) configured to operate as a power generator. In addition to functioning as motors, electromagnetic launchers can be operated as power generators, thus providing the ability to recover kinetic energy from incoming smart propellant devices during deceleration.

Energy captured or generated during deceleration of incoming smart propellant devices is transferred to an energy storage device 428 (e.g., one or more batteries), which provides power to components of the spacecraft 400 through a power conditioning module 430. In this example embodiment, the spacecraft 400 also includes a power source 432 (e.g., solar, nuclear) that outputs to the power conditioning module 430. For the sake of simplicity, only the processor/controller 416 is shown as being powered by an output of the power conditioning module 430.

Furthermore, in example embodiments, the ejection and recovery system 422 is configured such that the ejection system(s) 424 and/or recovery system(s) 426 can be repositioned in relation to the spacecraft (e.g., moved on rails about the exterior of the spacecraft, as discussed previously) for selecting the direction of an ejection trajectory or aligning a recovery device with an incoming smart propellant device. To this end, the ejection system(s) 424 and/or recovery system(s) 426 can also be provided with mechanisms for changing the direction an ejection device or recovery device is pointed, such as a gimbaled platform to facilitate directional adjustments (e.g., in azimuth and elevation).

Figure 5:
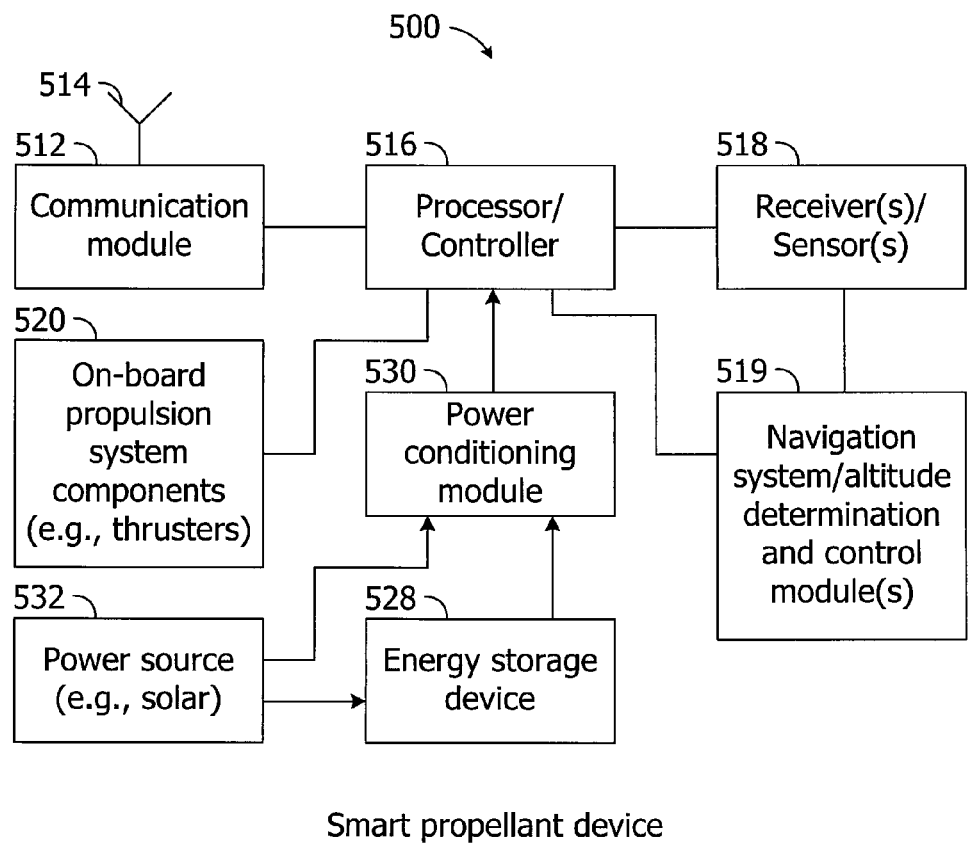
FIG. 5 is a system diagram of an example smart propellant device.

Referring FIG. 5, in an example embodiment, a smart propellant device 500 includes a communication module (or subsystem) 512 and an antenna (or multiple antennas) 514, which allow the smart propellant device 500 to establish communication links with other wireless communications devices. The communication module 512 includes, for example, receivers and transmitters (e.g., a transceiver) and a communications interface devices (e.g., radio modems). The communication module 512 allows the smart propellant device 500 to receive information transmitted by the spacecraft 400, or from other smart propellant devices, as well as other sources, and to broadcast information to the spacecraft 400 and/or other smart propellant devices. Information received by the communications module 512 is provided to the processor/controller 516 which is programmed to control the smart propellant device 500 and its various subsystems.

In this example embodiment, the smart propellant device 500 includes receiver(s)/sensor(s) 518 (e.g., GPS receivers and optical sensors) and navigation system/altitude determination and control module(s) 519, which interface with each other and the processor/controller 516. By way of example, the receiver(s)/sensor(s) 518 and navigation system/altitude determination and control module(s) 519 are configured to function as a position determination device that generates position information pertaining to the location of the smart propellant device 500.

Precision position and velocity determination can be provided by GPS receivers for LEO applications such as satellite rephasing. Commercially-available GPS receivers suitable for 1-to-10-kg class spacecraft include, for example, the SGR-05U-Space GPS Receiver (available from Surrey Satellite Technology Ltd., Guildford, Surrey, United Kingdom) and the GPS-12-V1 GPS Receiver (available from SpaceQuest Ltd., Fairfax, Va., USA).

In example embodiments, the receiver(s)/sensor(s) 518 include devices of different types and/or devices that are based on different technologies. In example embodiments, the receiver(s)/sensor(s) 518 include devices that provide different degrees of accuracy, which can be utilized during different phases or portions of a maneuver. By way of example, a modified NovAtel receiver can be used for both position determination and GPS occultation measurements. See, e.g., Sarda, K., Grant, C., Eagleson, S., Kekez, D. D., Shah, A., and Zee, R. E., "Canadian Advanced Nanospace Experiment 2 Orbit Operations: One Year of Pushing the Nanosatellite Performance Envelope," SSC09-IV-6, *Proceedings of the 23nd Annual AIAA/USU Conference on Small Satellites*, Logan, Utah, USA (Aug. 10-13, 2009), pp. 1-19, which is hereby incorporated by reference. The position accuracy for such receivers is ~10-meters (95% of the time), and the velocity accuracies range from 3 to 15-cm/s. This level of accuracy is sufficient for general trajectory control, for many maneuvers, over at least 99% of the smart propellant orbit. During the terminal guidance phase (e.g., during the last 100 seconds before rendezvous), a higher degree of accuracy in relative position determination (e.g., 1-cm or better, in some instances) is required to best facilitate recapture of smart propellant and avoid misalignments between the trajectory of the incoming propellant and the recovery device that could result in damage to the host spacecraft. Relative position accuracies of ~2-cm are possible using carrier-phase differential GPS. See, e.g., Corazzini, T, Robertson, A, Adams, J. C., Hassibi, A., and How, J. P., "GPS Sensing for Spacecraft Formation Flying," Institute of Navigation GPS-97, Kansas City, Mo. (September 1997), which is hereby incorporated by reference. In an envisioned embodiment, one or more optical sensors that provide relative position determination accuracy of ~1-cm or greater would be utilized by the one or more smart propellant devices (e.g., for sensing during the terminal guidance phase).

In this example embodiment, the smart propellant device 500 also includes on-board propulsion system components 520 (e.g., thrusters). In example embodiments, the on-board propulsion system components 520 include devices of different types and/or devices that are based of different technologies. In example embodiments, the on-board propulsion system components 520 include devices that provide different specific impulse, which can be utilized during different phases or portions of a maneuver. By way of example, the on-board propulsion system components 520 can include high specific impulse propulsion devices (e.g., electric microthrusters) for slow corrections, and low specific impulse propulsion devices (e.g., chemical microthrusters) for terminal guidance. The smart propellant device 500 also includes an energy storage device 528 (e.g., one or more batteries), which provides power to components of the smart propellant device 500 through a power conditioning module 530. In this example embodiment, the smart propellant device 500 also includes a power source 532 (e.g., solar) that outputs to the power conditioning module 530. For the sake of simplicity, only the processor/controller 516 is shown as being powered by an output of the power conditioning module 530.

Further with regard to the on-board propulsion system components 520, the magnitude of the required propulsive delta-V is a function of the number of potential ejections, accelerator velocity error, and orbit altitude (drag effects). A reasonable order-of-magnitude estimate is to assume a required delta-V of 1% of the ejection velocity for acceleration velocity error, plus an additional 1% for orbit corrections. The delta-V requirement for the final orbit corrections during terminal guidance can be quite small. For example, in some instances, a 10-m error (from GPS) at the beginning of the 100-s terminal phase requires a correction delta-V of only 0.1-m/s. Higher-order geopotential effects starting with J2 (oblateness coefficient) can also be accounted for. For example, the remaining propellant allocated for orbit corrections can be used to counteract these effects, plus air drag and solar pressure. While chemical monopropellant thrusters can provide specific impulse sufficient for an orbit rephasing maneuver (e.g., specific impulse greater than ~190-s), in an envisioned example embodiment, higher specific impulse propulsion devices (e.g., electric microthrusters with $I_{sp}$, in excess of 1000-s) are used for slow corrections over >99% of the smart propellant orbit, and lower specific impulse propulsion devices (e.g., chemical microthrusters) for terminal guidance.

Figure 6:
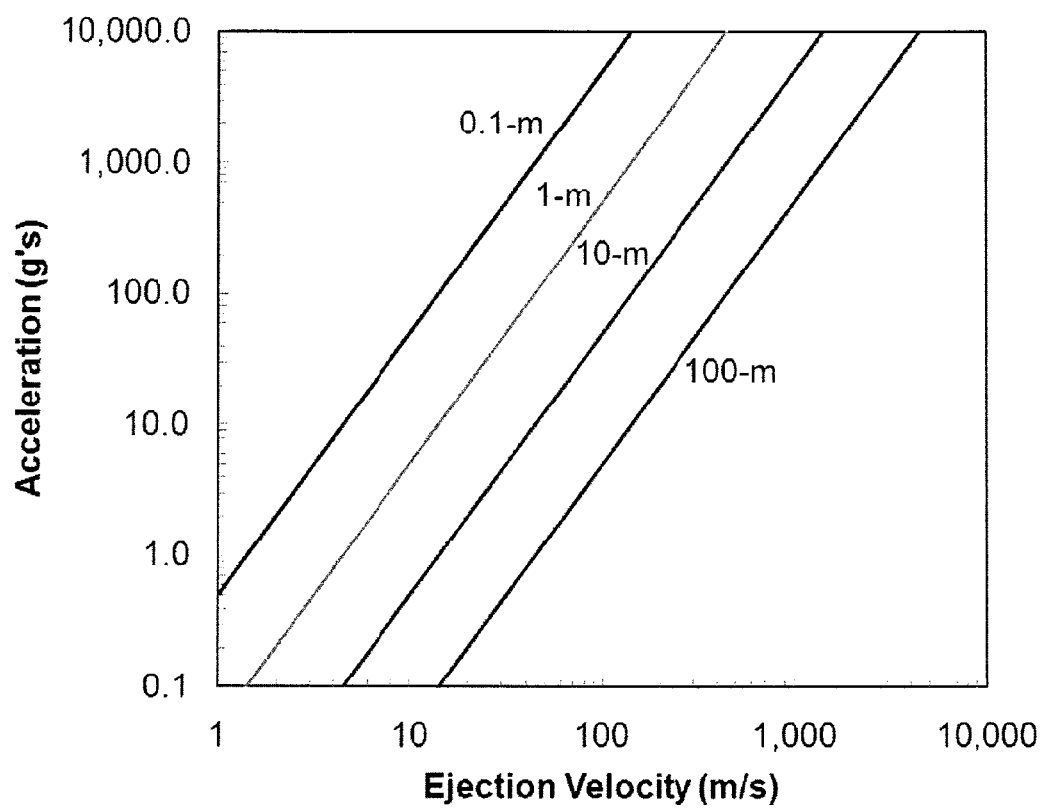
FIG. 6 is a plot showing average acceleration as a function of ejection (or incoming) velocity for different accelerator lengths.

Acceleration (and deceleration) levels are an important factor in smart propellant design. FIG. 6 shows average acceleration level in g's as a function of ejection (or incoming) velocity for accelerator lengths of 0.1, 1, 10, and 100-m. For a smart propellant rephasing mission in LEO with a 50-m/s ejection velocity, a 1-meter long accelerator will generate an average acceleration of 128-g's. The majority of mass in a smart propellant device can be used for structure, with the electronics encapsulated to provide high-g resistance.

The one or more smart propellant devices can be provided in the form of small spacecraft with communications, navigation determination, attitude determination and control, position determination, and thrusters for fine-tuning trajectories to facilitate recovery/recapture of smart propellant mass. Thus, in an example propulsion system, the one or more smart propellant devices each include a housing (e.g., spherical in shape to minimize the effect of orientation errors during recovery/recapture), a processor within the housing, a position determination device that generates position information, and one or more thrusters configured to receive control commands from the processor, the processor for each of the one or more smart propellant devices being programmed to control movement of the smart propellant device after the smart propellant device has been ejected from the spacecraft and return the smart propellant device to the spacecraft. In an example embodiment, the one or more smart propellant devices are controlled in consideration of one or more ejection forces imparted to the spacecraft when the one or more smart propellant devices are ejected from the spacecraft.

In an example embodiment, the processor for each of the one or more smart propellant devices is programmed to return an ejected smart propellant device to the spacecraft (e.g., from an anti-flight direction or a flight direction in relation to movement of the spacecraft). The scope of the invention also includes propulsion systems and methods facilitating the recovery of smart propellant devices returning to the spacecraft from other directions. The processor for each of the one or more smart propellant devices is programmed to generate commands (including guidance control commands) for controlling the smart propellant device. In an example embodiment, the one or more smart propellant devices are programmed to return to the spacecraft after being re-ejected (i.e., ejected a second or subsequent time).

In an example embodiment, the processor for each of the one or more smart propellant devices is programmed to return the smart propellant device to the spacecraft after the spacecraft has completed an integer number of orbits.

In an example embodiment, the processor for each of the one or more smart propellant devices is programmed to control the smart propellant device to travel along a trajectory. In an example control scheme, the trajectory is at least initially elliptical in shape. In an example embodiment, the processor for each of the one or more smart propellant devices is programmed to control movement of the smart propellant device by modifying the trajectory, e.g., in consideration of a position determination made by the processor. In an example embodiment, the position determination is made utilizing a Global Positioning System (GPS) or an optical sensor. In an example embodiment, the position determination is made utilizing a Carrier-phase Differential Global Positioning System (CDGPS) technique. In an example embodiment, the position determination is made during a terminal guidance phase of the trajectory.

In an example embodiment, the processor for each of the one or more smart propellant devices is programmed to control the one or more smart propellant devices to facilitate a maneuver by the spacecraft. In an example embodiment, the maneuver is facilitated exclusively utilizing smart propellant devices that are initially ejected from the spacecraft. In an example embodiment, the maneuver is facilitated without utilizing any forces imparted upon the spacecraft resulting from recovering, or recovering and ejecting, a propellant mass that was initially ejected or launched from a location other than the spacecraft.

As further discussed below, the propulsion technology described herein can be utilized to facilitate a variety of spacecraft maneuvers such as: injecting the spacecraft into or displacing the spacecraft from an orbit; raising or lowering an orbit of the spacecraft; moving a spacecraft along an orbit; or reducing an orbital velocity of the spacecraft to approximately zero. The spacecraft maneuver can include, by way of further examples, an apoapsis-reflection, orbit rephasing, or counter-streaming capture maneuver.

In example embodiments, the spacecraft maneuver includes deploying one or more thrusters of the one or more smart propellant devices (e.g., to reverse or otherwise modify a direction of movement of the one or more smart propellant devices). In an example embodiment, the one or more thrusters are deployed at or near apoapsis of the one or more smart propellant devices in relation to a gravitating body.

Spacecraft maneuvers can also include deploying a thruster of the spacecraft (e.g., the thruster of the spacecraft is deployed to reposition the spacecraft in relation to an airless primary body).

For maneuvers facilitated, at least in part, by the recovery of one or more smart propellant devices, the one or more smart propellant devices are controlled in consideration of one or more recovery forces imparted to the spacecraft when the one or more smart propellant devices are recovered at the spacecraft. For maneuvers facilitated, at least in part, by the ejection and recovery of one or more smart propellant devices, the one or more smart propellant devices are controlled in consideration of one or more ejection forces imparted to the spacecraft when the one or more smart propellant devices are ejected from the spacecraft and in consideration of one or more recovery forces imparted to the spacecraft when the one or more smart propellant devices are recovered at the spacecraft. For example, the one or more ejection forces result in a first impulse to the spacecraft that changes an orbit of the spacecraft, and the one or more recovery forces result in a second impulse to the spacecraft that further changes the orbit. In example embodiments, at least one of the one or more smart propellant devices is ejected at an ejection velocity and controlled to impact the spacecraft at a return velocity that is approximately equal to the ejection velocity.

Figure 7:
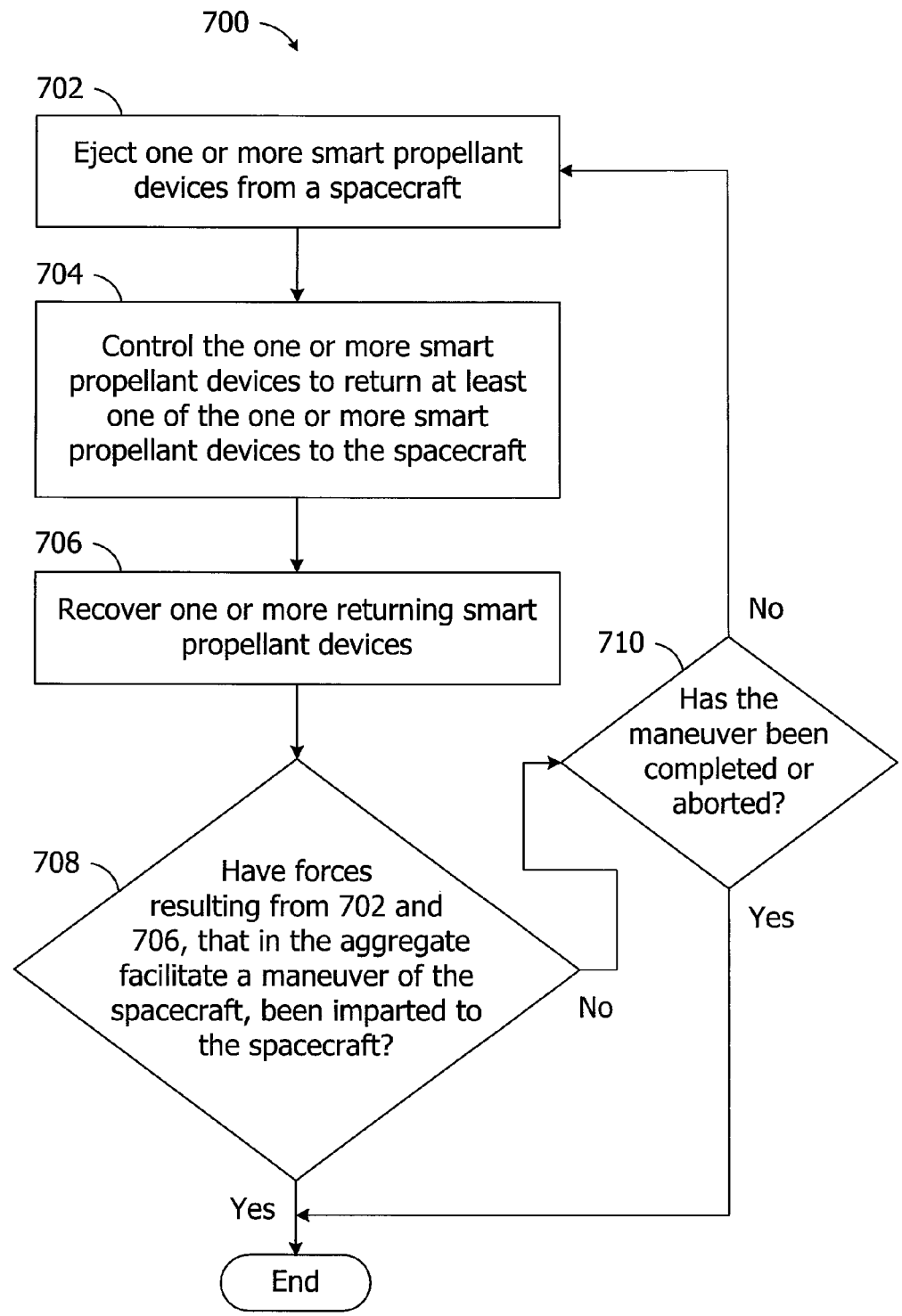
FIG. 7 is a flow diagram of an example propulsion method.

Referring to FIG. 7, in an example embodiment, a propulsion method 700 includes, at 702, ejecting one or more smart propellant devices from a spacecraft. At 704, the one or more smart propellant devices are controlled to return at least one of the one or more smart propellant devices to the spacecraft. At 706, one or more returning smart propellant devices are recovered. At 708, if an affirmative determination is made that forces resulting from 702 and 704, that in the aggregate facilitate a maneuver of the spacecraft, have been imparted to the spacecraft, the process is finished. If, however, the maneuver requires additional forces resulting from 702 and 704 to be imparted to the spacecraft, the process continues. At 710, if an affirmative determination is made that the maneuver has been completed or aborted, the process is finished. Absent such an override command, the process continues, repeating the sequence: 702, 704, and 706. Example maneuvers are discussed in the following sections.

Rephasing

Rephasing is a maneuver that changes the true anomaly of a spacecraft orbit. In practical terms, it changes where a spacecraft is along its orbit, without changing the other orbital parameters. Rephasing is typically used to change when a spacecraft flies over a given part of the Earth, or for geosynchronous satellites, to move a spacecraft over different regions of the Earth. The true anomaly of an individual satellite in circular orbit is typically changed by temporarily moving to a different altitude with a different orbital period, remaining at that altitude until the appropriate phase change has accumulated, followed by a return to the original altitude. For orbiting satellites, the orbital period τ is given by:

$$\tau = 2\pi(\alpha^3/\mu)^{1/2}, \qquad (4)$$

where α is the magnitude of the semi-major axis and μ is the gravitational constant G times the mass of the primary body;

for Earth satellites, this is numerically equal to 398600.44 $km^2/s^2$. The phase (true anomaly) change $\Delta v_d$ that occurs while occupying a different altitude drift orbit is given by:

$$\Delta v_d = 2\pi t_d (\tau_0 - \tau_1)/\tau_0 \tau_1, \quad (5)$$

where $t_d$ is the time at new altitude, $\tau_o$ is the original orbit period and $\tau_i$ is the orbit period at the new altitude. A higher temporary altitude results in an increased orbit period and a negative rate of change in true anomaly.

FIG. 8 shows the velocity increment $\Delta V$ required to produce a 180° phase change for a spacecraft in a 700-km altitude circular orbit using a 220-s $I_{sp}$ thruster as a function of maneuver time. Under these conditions, a 17-day maneuver time consumes 0.5% of the initial total spacecraft mass as propellant. Faster maneuvers require higher velocity increments and higher propellant mass fractions. If 10% of the initial spacecraft mass were allocated to propellant, only 20 of these 17-day maneuvers could be performed over the entire life of the satellite.

In some instances, for rephasing maneuvers using smart propellant, smart propellant masses between 0.1 and 10% of the host spacecraft would be ejected at speeds less than a few hundred meters per second. Because smart propellant can be reused, a single spacecraft could perform thousands of rapid, large angle rephasing maneuvers over its lifetime.

FIGS. 9A and 9B show spacecraft and smart propellant orbits before and after smart propellant ejection in an Earth-centered inertial frame, respectively. In this case, the spacecraft of mass $M_s$ starts in a 700-km altitude orbit and ejects a smart propellant mass $M_p$ at relative speed $V_e$ in the forward flight direction. The spacecraft gets a velocity increment $\Delta V_s$ of magnitude $$\Delta V_s = V_e / [1 + (M_s/M_p)] \quad (6)$$

in the retrograde direction, and thus enters an elliptical orbit with a perigee that is lower than the original orbit altitude, resulting in a shorter orbit period. The smart propellant gets a velocity increment $\Delta V_p$ of magnitude $$\Delta V_p = V_e / [1 + (M_p/M_s)] \quad (7)$$

in the posigrade direction, and thus enters an elliptical orbit with an apogee that is higher than the original orbit altitude, resulting in a longer orbit period. Referring to FIG. 9A, at T~35 minutes, the spacecraft has traveled further in angle around Earth than the propellant.

Figure 10:
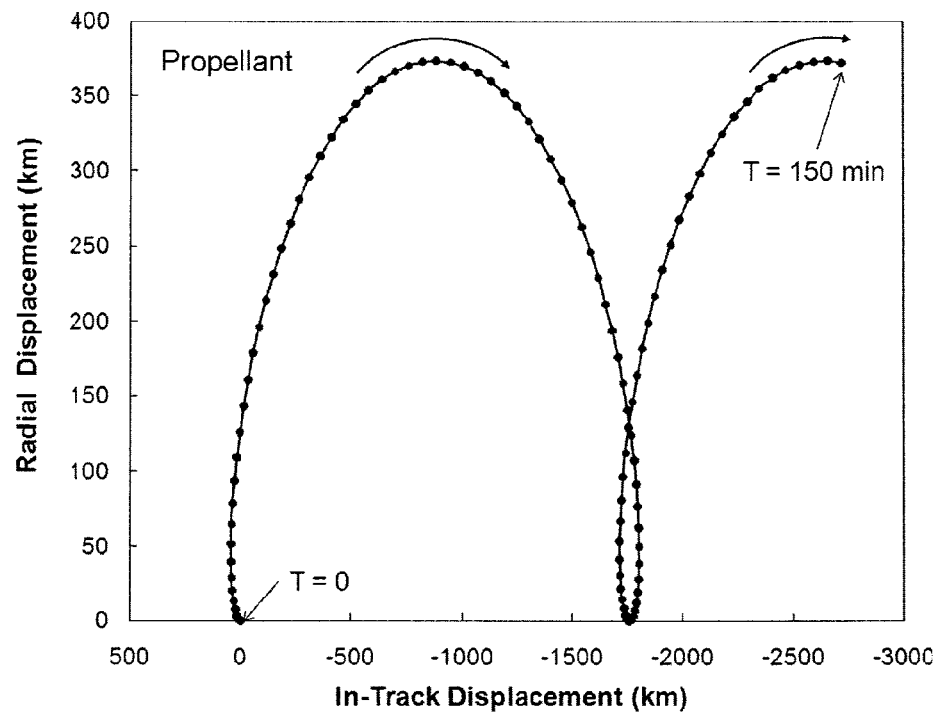
FIG. 10 is a plot showing propellant trajectory as viewed in a co-orbital reference frame rotating at the initial spacecraft angular rate.
Figure 11:
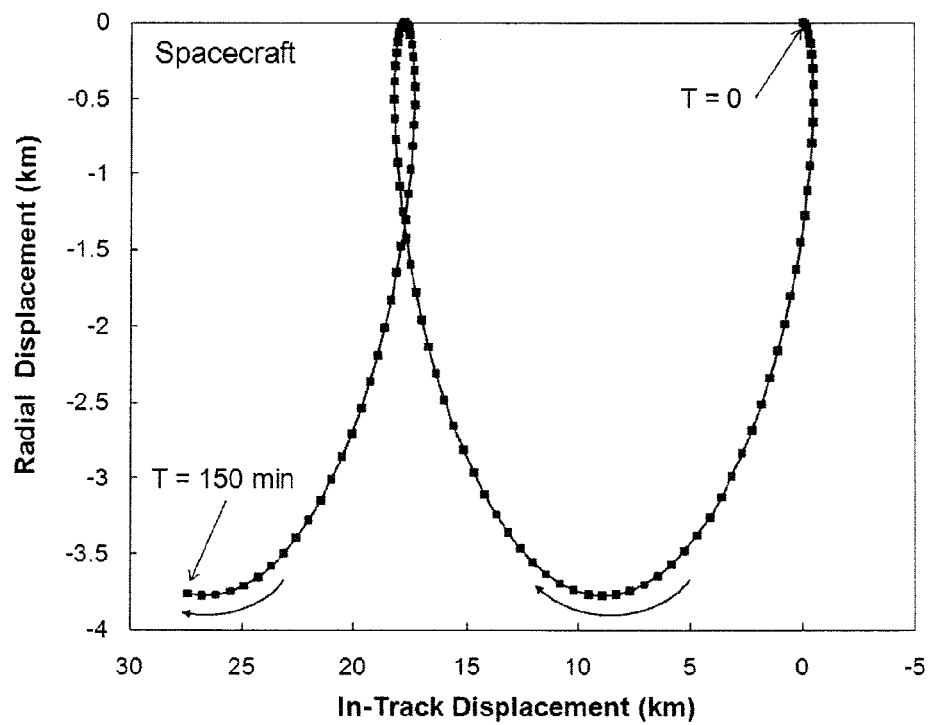
FIG. 11 is a plot showing spacecraft trajectory as viewed in a co-orbital reference frame rotating at the initial spacecraft angular rate.

In a reference frame centered on the pre-ejection spacecraft and rotating at the original orbital rate, the post-ejection spacecraft drifts predominantly forward while the smart propellant mass drifts predominantly rearward. FIGS. 10 and 11 show the initial trajectories of smart propellant and spacecraft, respectively, in this reference frame for the first 150 minutes after ejection. In this case, the propellant mass is 1% of the spacecraft mass, the propellant was ejected at 100 m/s, and each data point is 90 seconds apart. The spacecraft moves about 17.5-km forward per initial orbit period while the propellant moves 1750-km backward.

Figure 12A:
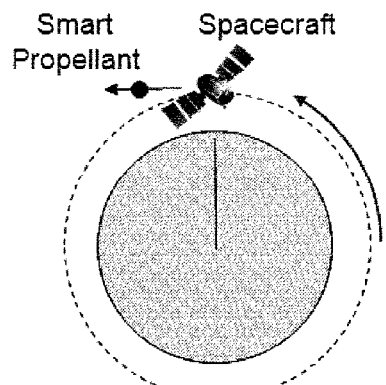
FIGS. 12A-12C show the trajectory evolution of an example smart propellant rephasing maneuver.
Figure 12B:
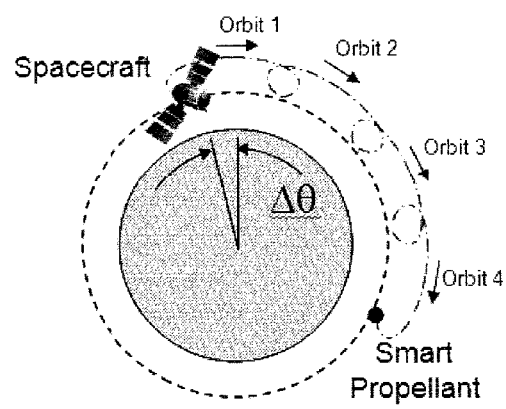
Figure 12C:
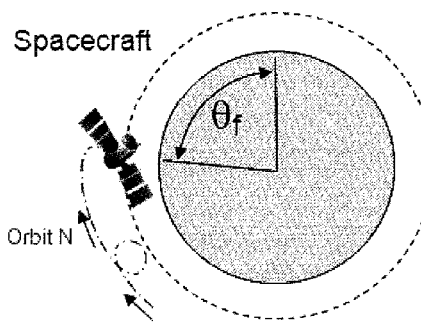

FIGS. 12A-12C show three schematic snapshots of trajectory evolution in this rotating reference frame on a larger scale. FIG. 12A shows propellant ejection in the forward flight direction. FIG. 12B shows a snapshot in the rotating reference frame 4 propellant orbits after ejection. The propellant has a longer orbital period than the original spacecraft orbital period, therefore it moves generally clockwise in this rotating reference frame. The spacecraft has a shorter period due to the impulse at ejection, therefore it moves counter-clockwise in this reference frame. If the initial ejection velocity was adjusted properly, the spacecraft and smart propellant mass come together at the original orbit altitude N propellant mass orbits later, as shown in FIG. 12C. The smart propellant mass impacts the satellite at relative speed $V_e$ from the retrograde direction, thus imparting a positive impulse to the spacecraft. The magnitude of the recapture impulse is equal to the initial ejection impulse, thus leaving the spacecraft plus smart propellant mass system in the initial circular orbit, but with a different true anomaly. In an example embodiment, initial ejection conditions are chosen to assure that the spacecraft and smart propellant mass meet N propellant orbits later.

Figure 13:
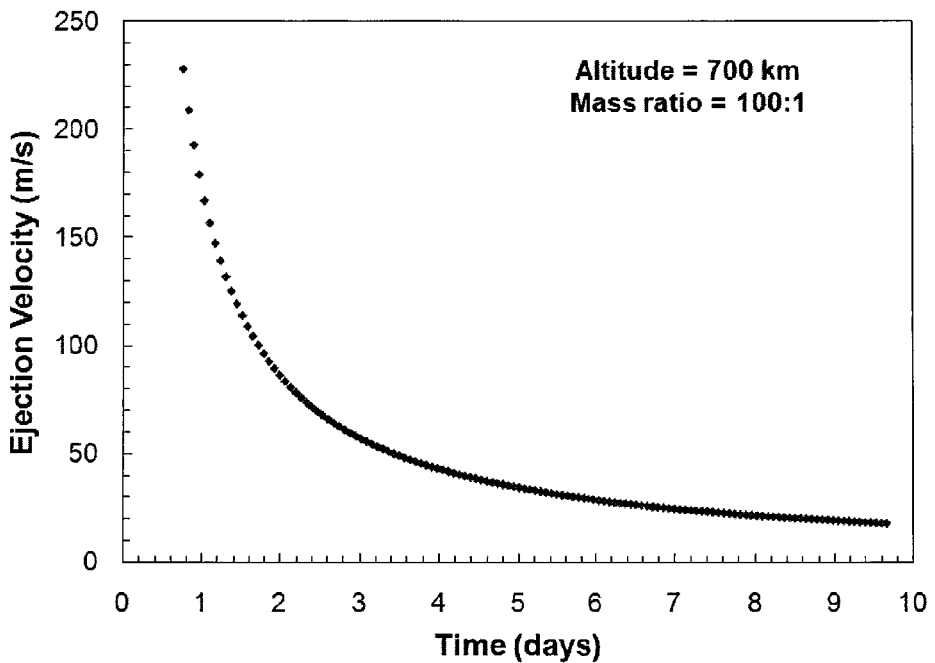
FIG. 13 is a plot showing ejection velocity vs. rephase time for a smart propellant rephasing maneuver with smart propellant mass ratio of 1%.
Figure 14:
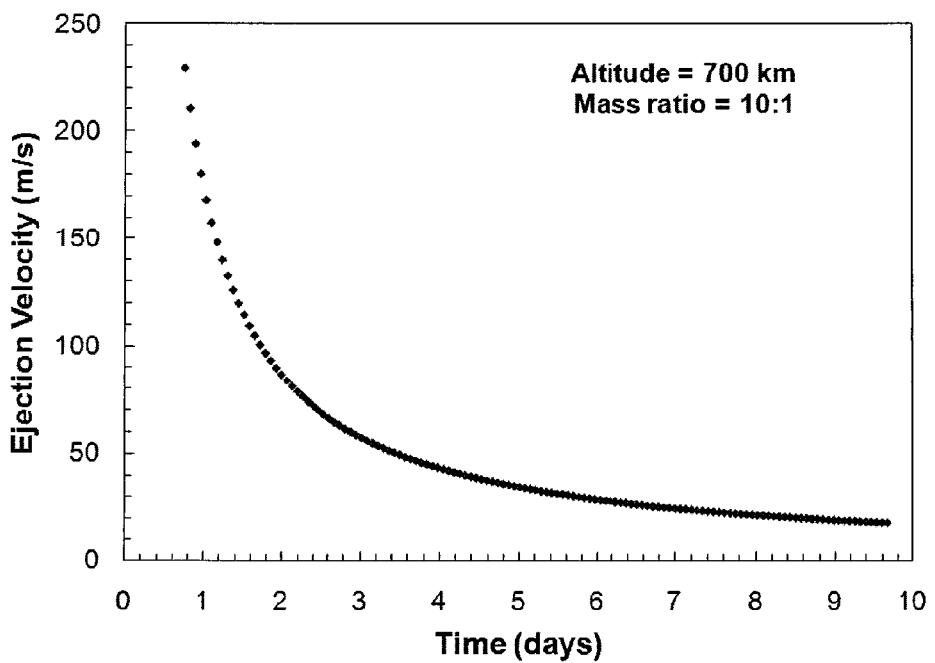
FIG. 14 is a plot showing ejection velocity vs. rephase time for a smart propellant rephasing maneuver with smart propellant mass ratio of 10%.

FIGS. 13 and 14 show rephase maneuver time as a function of ejection velocity for a 700-km altitude circular orbit with smart propellant mass ratios $(M_p/M_s)$ of 1% and 10%, respectively. The phase change is 3.60° for the 1% mass fraction and 36.0° for the 10% mass fraction. In this example, the ejection velocities are quantized; specific velocities are required to ensure spacecraft and smart propellant convergence at the appropriate time.

The data points in FIGS. 13 and 14 correspond to an integer number N propellant orbits and N+1 spacecraft orbits where N ranges from 10 to 140. The data points are almost identical at the illustrated scale, however, the 36° phase change in FIG. 14 is ten times larger than the 3.6° phase change in FIG. 13. A 17-day, 180° rephase maneuver can be performed using 5 successive 36° steps, each lasting 3.4 days. From FIG. 14, it can be seen that the ejection velocity for this case would be 51.2 m/s. Based on the mass fraction for the chemical thruster maneuver (0.5%), the exit velocity of the chemical thruster (2.2-km/s), and the mass fraction for the smart propellant (10%), a required smart propellant exit velocity can be estimated as follows:

$$(0.5\%/10\%) * 2.2\text{-km/s} = 110\text{-m/s}. \quad (8)$$

The actual required exit velocity is about half of this.

Orbit rephasing is a maneuver that does not change the total energy of the spacecraft; the semi-major axis of the orbit is not affected. In the traditional rephase maneuver, thrusting is performed both parallel and anti-parallel to the flight direction with equal magnitudes, thus resulting in a zero net change in spacecraft velocity at the end of the maneuver. With smart propellant, the reversing impulse is substantially free in comparison and occurs when the propellant recontacts the spacecraft. The smart propellant maneuver is therefore twice as efficient as the conventional thrusting maneuver. In addition, if the kinetic energy of the returning propellant can be stored for reuse during the next ejection, the net energy usage is at or near zero.

Based on FIGS. 13 and 14, in this example, it can be seen that smart propellant must be ejected from the host spacecraft at velocities between 20 and 200 m/s for rephasing times between 1 and 9 days at 700-km altitude. The phase change per jump is proportional to the smart propellant mass fraction, with phase changes ranging from a few degrees to almost 40 degrees for smart propellant mass fractions between 1% and 10%. In contrast with a chemical thruster rephasing maneuver, the smart propellant rephasing maneuver can be done over and over again, potentially enabling hundreds of rephasing maneuvers. Ideally, no propulsion is required other than the ejection of smart propellant. In practice, a number of effects such as ejection velocity errors, differential drag, and nodal regression need to be counteracted using propulsion on board the smart propellant unit.

Rephasing can be accomplished by ejecting a packet of mass at low velocity in either the flight or anti-flight direction, and catching the mass at a later time. For example (and rephasing in the opposite direction), a spacecraft in a counter-clockwise circular orbit about a central body ejects a mass in the anti-flight direction. The mass (smart propellant) is in an orbit with a smaller semi-major axis and hence has a shorter orbital period. As seen from the spacecraft, the smart propellant leaves in the anti-flight direction, drops towards the Earth, moves ahead of the spacecraft as it heads towards and finally away from the Earth, and comes back to touch the original orbit ahead of the spacecraft. Consequently, a slight increase in orbital velocity is imparted to the spacecraft due to the mass ejection, after which the spacecraft follows a more subtle cycloidal motion. In this example, the smart propellant returns to the spacecraft from the forward flight direction, imparting an equal, but opposite, velocity increment to the spacecraft. The net result is that the spacecraft's true anomaly has changed by the angle θ. Ideally, the energy expended to eject the propellant is recovered, and no propellant mass is lost. In practice, minor trajectory changes will be required to counteract higher-order non-spherical gravitational tidal forces, atmospheric drag at low altitudes, and solar pressure effects at high altitudes.

Temporary Apogee/Perigee Modification

As shown in FIGS. 9A and 9B, smart propellant rephasing temporarily decreases spacecraft perigee when the desired phase change is positive. When the desired phase change is negative, spacecraft apogee temporarily increases. Space and Earth environmental sensing missions can benefit from this ability to change altitude ranges, particularly if the range can be changed many times.

Figure 15:
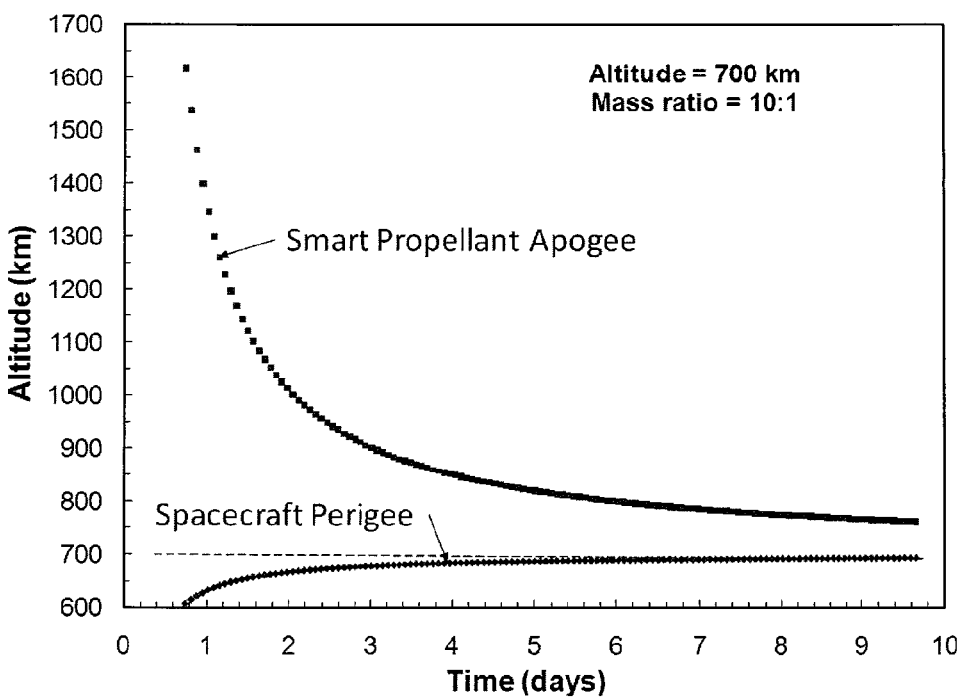
FIG. 15 is a plot showing spacecraft perigee and smart propellant apogee for a smart propellant rephasing maneuver with smart propellant mass ratio of 10%.

FIG. 15 shows spacecraft perigee and smart propellant apogee altitudes for the rephasing conditions used to generate FIG. 14 (10% smart propellant mass fraction, 700-km circular orbit). Spacecraft perigee can be reduced by almost 100-km over 11 orbits (0.75 days) using a smart propellant ejection speed of 230-m/s (see FIG. 14).

Figure 16:
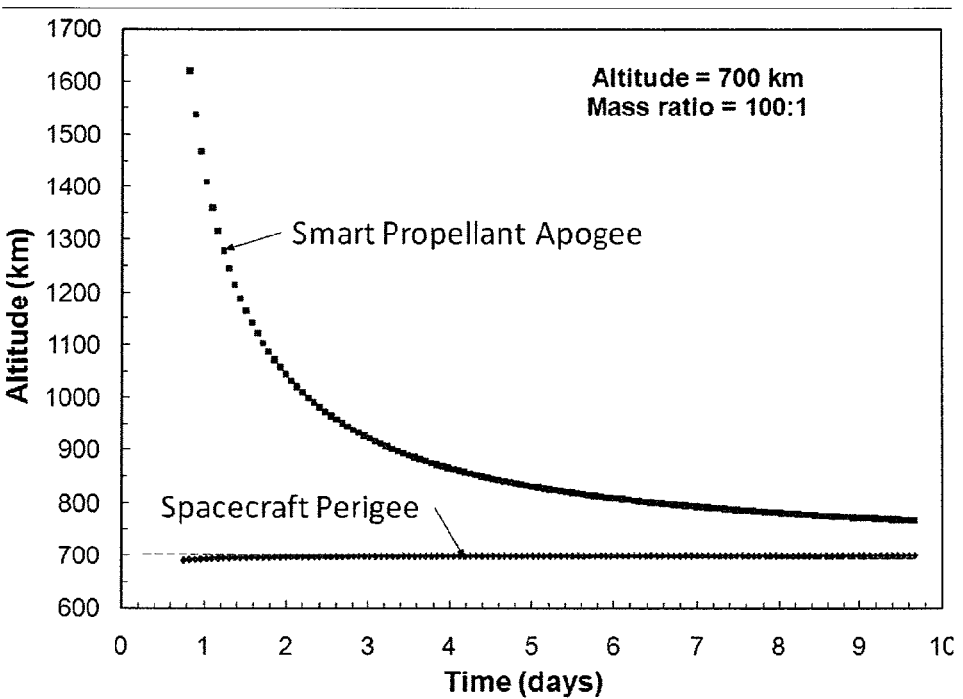
FIG. 16 is a plot showing spacecraft perigee and smart propellant apogee for a smart propellant rephasing maneuver with smart propellant mass ratio of 1%.

If space environmental sensing is desired, and the sensors can fit within the desired smart propellant mass limit, smart propellant units can function as smart environmental sensors. These smart sensors return to the spacecraft for data download and re-ejection into new orbits. This approach is very favorable for high data rate sensors, for example, hundreds of gigabytes of data can be integrated into a sub-kilogram mass module and downloaded within hours to the host satellite once docked. FIG. 16 shows spacecraft perigee and smart propellant apogee altitudes for the rephasing conditions used to generate FIG. 13 (1% smart propellant mass fraction, 700-km circular orbit). There is a small change in spacecraft perigee; however, in this example, the smart propellant can access altitudes above 1600-km.

Lunar Surface Shuttle

The lowest velocity increment to go from a circular orbit to surface landing results from an orbit slightly above the surface, with an impulse large enough to cancel the circular orbit velocity $V_o$. The vehicle then drops to the surface. Launch back into orbit requires the reverse process with a short vertical ascent to orbit altitude, and another horizontal impulse of equal magnitude. The total minimum velocity increment for landing and return to orbit is therefore $2V_o$.

A spacecraft in circular orbit about a primary body has an orbital velocity $V_o$ given by $$V_o = (\mu/\alpha)^{1/2}. \quad (9)$$

For an orbit just above the lunar surface, $V_o$=1681 m/s.

Table 1 (below) lists the minimum propellant mass fractions required to perform the surface landing and return mission once, twice, and three times using a single vehicle with a specific impulse of 311-s. Performing the round trip once is challenging, but repeating it more than once using conventional rocket propulsion becomes impractical due to the vanishingly small (<10% at best) payload mass fractions.

TABLE 1

Minimum Velocity Increment and Propellant Mass Fraction at 311-s $I_{sp}$ for Lunar Landing and Return to Low Lunar Orbit (LLO).

| Number of Missions | Velocity Increment | Propellant Mass Fraction |
| --- | --- | --- |
| 1 | 3362 m/s | 0.668 |
| 2 | 6724 m/s | 0.890 |
| 3 | 10086 m/s | 0.963 |

On-orbit refueling is one option for a reusable Lunar surface shuttle, but the propellant for each landing and return will have to be brought from the Earth in the foreseeable future. Regardless, smart propellant offers significant propellant recycling, thus facilitating at least part of a sustainable Lunar transportation architecture.

Figures 17A, 17B, 17C:
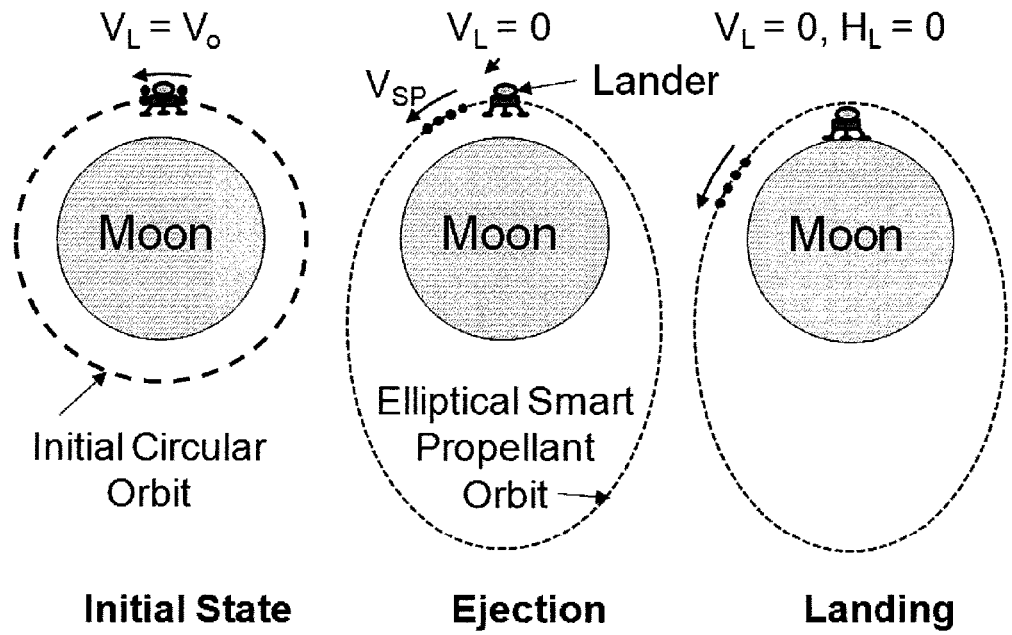
FIGS. 17A-17E show the trajectory evolution of an example smart propellant Lunar landing and re-orbit maneuver.
Figures 17D, 17E:
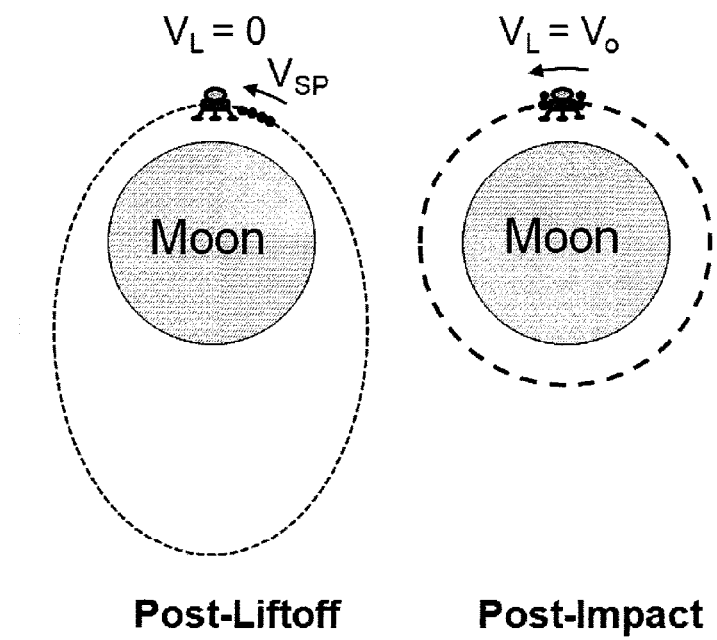

FIGS. 17A-17E show a schematic sequence of an example lunar landing and return mission using smart propellant. In FIG. 17A, a lunar landing vehicle with smart propellant is in a low lunar orbit (LLO) with $V=V_o$. In FIG. 17B, smart propellant is ejected in the forward flight direction into a higher-energy elliptical orbit with $V=V_{SP}$ while the lander orbital velocity $V_L$ is reduced to zero. In FIG. 17C, the lander has dropped to the lunar surface, using some on-board propellant for a soft landing. For a 1-km drop, the soft landing delta-V is about 60-m/s (much less than the original 1681-m/s orbital velocity). In FIG. 17D, at the appropriate time, the lander rises from the surface, again using a small amount of on-board propulsion. In FIG. 17E, the returning smart propellant impacts the lander from the original anti-flight direction, putting the entire lander and smart propellant system back into the initial circular orbit. The initial orbital energy and mass of the smart propellant plus spacecraft system is relatively unchanged by the mission, and can therefore be repeated many times. Also, as is the case with orbit rephasing, the net energy usage is zero.

Figure 18:
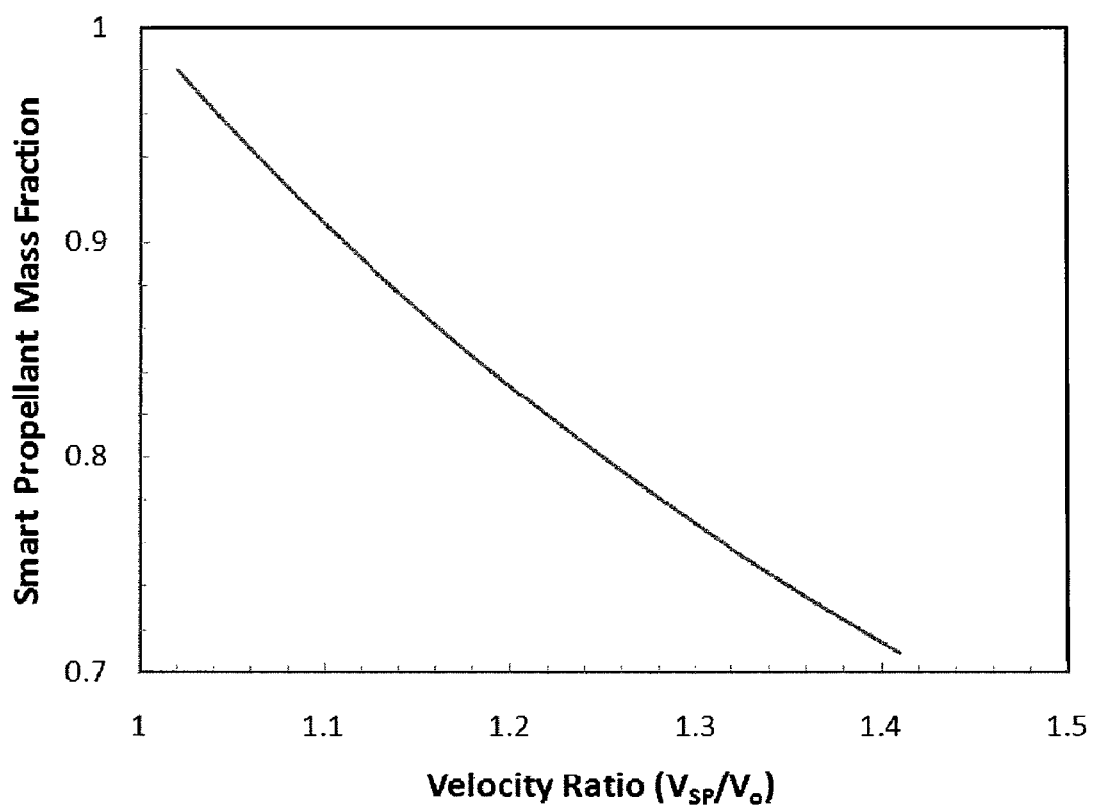
FIG. 18 is a plot showing smart propellant mass fraction as a function of velocity ratio for landing and re-orbit.

The ejection velocity for smart propellant $V_{SP}$ in this application ranges from $V_o$ to $V_e$ where $V_e$ is the local escape velocity. Escape velocity is equal to the local circular orbit velocity times $\sqrt{2}$. FIG. 18 shows the smart propellant mass fraction, as a function of $V_{SP}/V_o$, to produce a lander orbital velocity of zero. The lowest smart propellant mass fraction of 71% occurs near $V_{sp}$=1.4 $V_o$ (about 2350-m/s for LLO), which is only slightly higher than the minimum propellant mass fraction from Table 1 for a single mission with conventional thrusters at 311-s $I_{sp}$.

FIG. 18 is valid for any airless primary body such as an asteroid, moon, dwarf planet, or planet. Ejection velocities are proportional to the circular orbit velocity, but the mass ratios remain the same.

Table 2 (below) lists the minimum and maximum smart propellant ejection velocities for landing and re-orbit about various bodies in our solar system. For the smaller bodies with low orbit velocities, conventional rocket propulsion offers a lower propellant mass fraction even for multiple landings. The smart propellant approach is beneficial primarily for the larger moons in the solar system.

TABLE 2

Surface orbit and escape velocities, and minimum propellant mass fractions using 311-s $I_{sp}$ thrusters, for representative solar system bodies.

| Body | Surface Orbit Velocity | Surface Escape Velocity | Prop. Mass Fraction 1 Trip | Prop. Mass Fraction 3 Trips |
|---|---|---|---|---|
| Deimos | 3.6-m/s | 5.1-m/s | 0.24% | 0.71% |
| Phobos | 7.3-m/s | 10.3-m/s | 0.48% | 1.43% |
| 6-Hebe | 91-m/s | 130-m/s | 5.8% | 16.4% |
| 2-Pallas | 220-m/s | 311-m/s | 13.4% | 35.2% |
| 4-Vesta | 248-m/s | 351-m/s | 15.0% | 38.6% |
| 1-Ceres | 359-m/s | 508-m/s | 21.0% | 50.7% |
| Europa | 1430-m/s | 2020-m/s | 60.9% | 94.0% |
| Moon | 1681-m/s | 2377-m/s | 66.8% | 96.3% |
| Callisto | 1730-m/s | 2440-m/s | 67.9% | 96.7% |
| Mercury | 3000-m/s | 4250-m/s | 86.0% | 99.7% |

Apoapsis Reflection Maneuver

An example of a propellant recycling maneuver is called apoapsis reflection. It is based on the conservation of energy (kinetic plus gravitational potential energy) and orbital angular momentum for satellites. Orbital angular momentum is equal to the instantaneous azimuthal spacecraft velocity times the distance to the center of mass of the gravitationally attracting primary body (e.g., Earth, moon, sun, etc.). The kinetic energy, and hence orbital velocity, of a satellite in a closed or open orbit decreases as it moves away from the primary body. For an object in a parabolic escape trajectory, the azimuthal and radial velocities approach zero at infinite distance at infinite time. A small orbit perturbation near infinity can cause a satellite to retrace its parabolic orbit in a retrograde fashion. In this example maneuver, a propellant mass ejected along a parabolic or nearly parabolic escape trajectory is returned to (or very close to) the original spot at which it was ejected (e.g., from an orbiting spacecraft). In practice, a smart propellant device can be ejected at a velocity slightly lower than escape velocity, and the perturbation is supplied by onboard thrusters or solar sail at or near apoapsis (furthest distance from the gravitating body). Escape velocity for a circular orbit is $2^{1/2} V_{circ}$, where $V_{circ}$ is the circular orbit velocity. The smart propellant has a minimum velocity at apoapsis, which is the point selected for reversing direction in this example of a closed (elliptical—not parabolic or hyperbolic) orbit maneuver. Use of a closed orbit allows the propellant to return in a finite time. By properly adjusting the orbit and hence orbit period for the smart propellant, both the smart propellant and spacecraft can return to the same point in space at the same time for rendezvous and recycling.

Figure 19A:
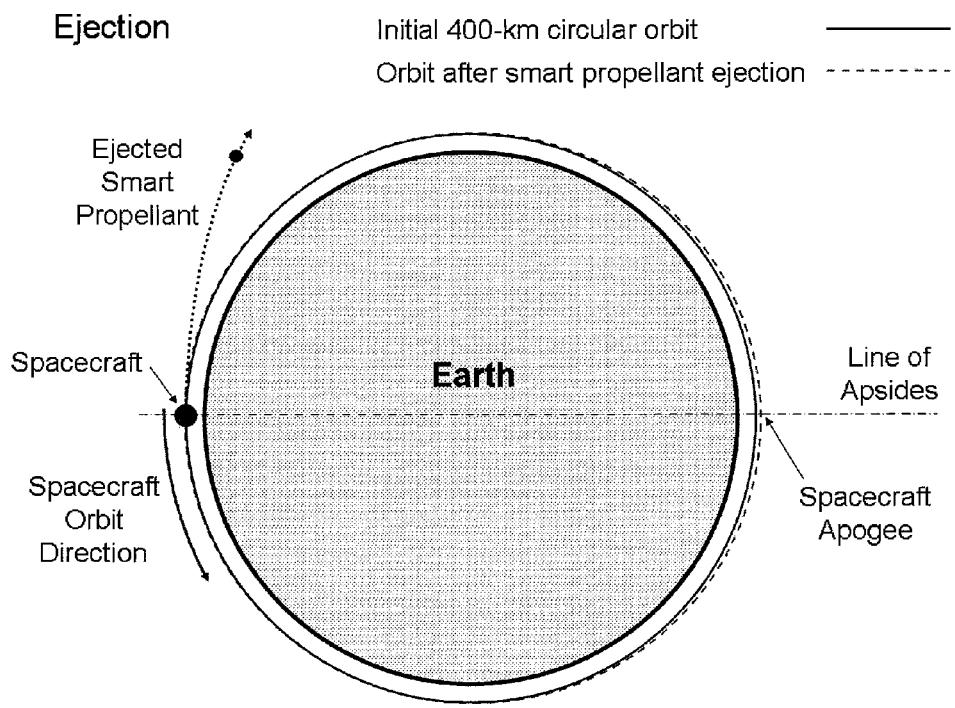
FIGS. 19A-19D show the trajectory evolution of an example apoapsis reflection maneuver.
Figure 19B:
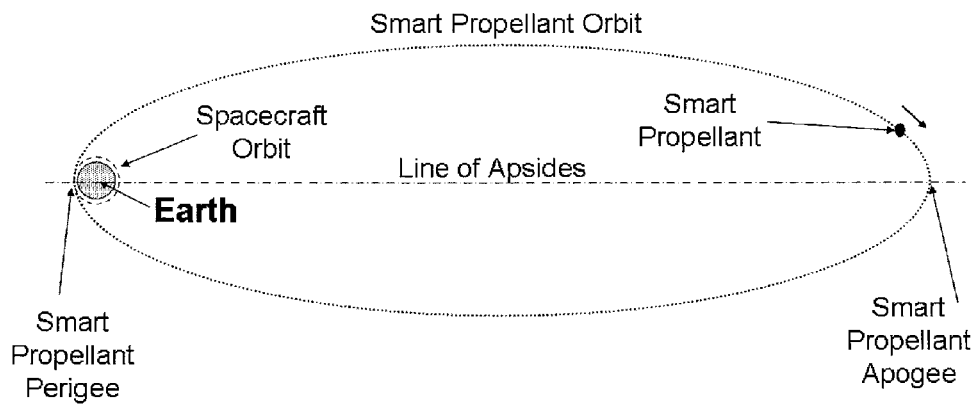
Figure 19C:
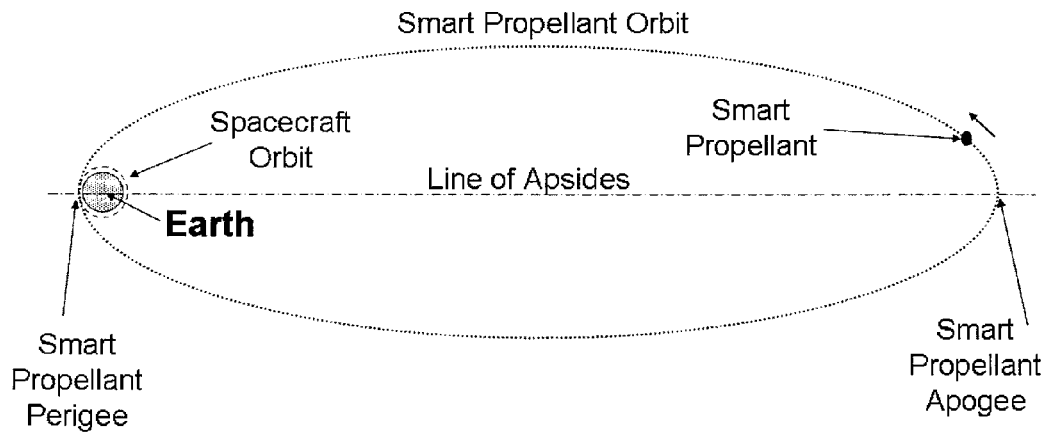
Figure 19D:
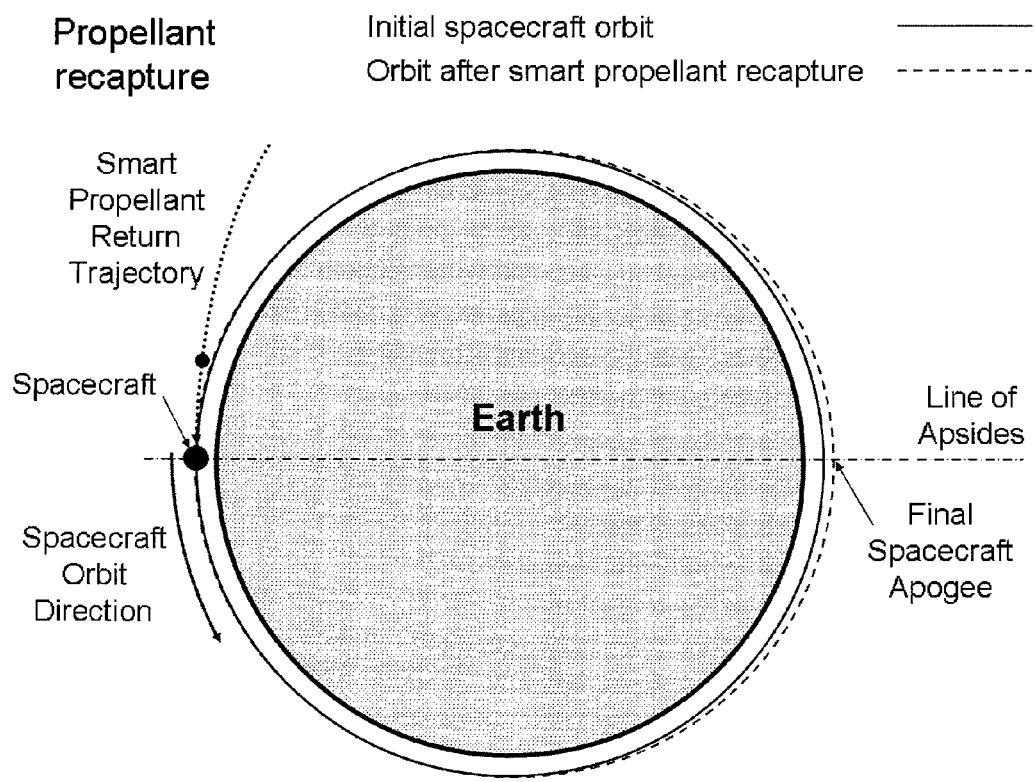

FIGS. 19A-19D show a schematic sequence of an example apoapsis reflection maneuver. Referring to FIG. 19A, in this example maneuver, a 1000 kg spacecraft in a posigrade circular orbit above the Earth at an altitude of 400 km. Spacecraft orbital velocity is a constant 7.669 km/sec, and escape velocity for this orbit is 10.613 km/sec. If the spacecraft ejects a 1 kg smart propellant mass at 18.406 km/sec in the retrograde direction, the spacecraft velocity will increase to 7.687 km/sec. An electromagnetic accelerator or other ejection device capable of providing such ejection velocities can be employed. This new velocity puts the spacecraft in an elliptical orbit with a perigee of 400 km and an apogee (apoapsis for an Earth-centered orbit) of 465.5 km. Referring to FIG. 19B, the ejected smart propellant mass has a retrograde velocity of 10.719 km/sec, putting it on a retrograde orbit with perigee of 400 km and apogee of 280,400 km. After 77.7 hrs the smart propellant is at apogee with an altitude of 280,400 km and a significantly reduced velocity of 0.2534 km/sec. The smart propellant now fires a thruster in the antiflight direction to produce a velocity increment of 0.5067 km/sec. This reverses the flight path and puts the smart propellant in a posigrade orbit (FIG. 19C). After 77.7 hrs the smart propellant returns to perigee with an instantaneous velocity of 10.613 km/sec. The 1000 kg spacecraft has performed 100 orbits during this interval and, provided that the propellant orbit period was adjusted properly, the host spacecraft will be present and both will collide with a relative velocity of 3.032 km/sec (FIG. 19D). As discussed previously, an electromagnetic accelerator/decelerator can be used as a power generator, thereby facilitating deceleration of the incoming smart propellant mass while extracting the excess kinetic energy. By recapturing the smart propellant in this manner, it can be reused over and over again. The impact of the smart propellant device imparts an additional impulse to the spacecraft, further boosting its apogee to 476.7 km (~11.2 km increase). Thus, in this example maneuver, the spacecraft has received a velocity increase of 21 msec with a miniscule reduction in mass.

The apoapsis reflection maneuver is extremely efficient in the utilization of propellant mass. Because smart propellant maneuvering occurs near apoapsis where velocities are low, thrusting periods of many hours are possible, and high $I_{sp}$, electric thrusters can be used to advantage. If the smart propellant module uses a 1000 sec $I_{sp}$, electric thruster for the 0.507 km/sec apogee reflection maneuver, the mass loss based on the rocket equation is only 50.4 g. This yields an effective $I_{sp}$ for the spacecraft plus smart propellant system of 43,000 sec with an energy expenditure equal to that of an 1880 sec $I_{sp}$ system. The limitations of the rocket equation and the power equation for electric thrusters have been reduced by more than an order of magnitude. In practical terms, much greater mass can be delivered throughout cislunar and interplanetary space using the smart propellant-based propulsion methods and systems. For this particular maneuver, exit velocities up to 14 km/sec are required. Other maneuvers require significantly reduced exit velocities.

The propulsion requirements on the smart propellant mass can be reduced by increasing the initial launch velocity up to the escape velocity limit, but the round-trip time for recycling the mass may become excessive.

The L1 and L3 Lagrange points can serve as effective "infinity" points for apoapsis (apogee for Earth-centric orbits) reflection maneuvers. These are unstable orbital locations that produce drastically different resultant trajectories for minor perturbations in initial position or velocity. Earth's gravitational influence prevents use of very high apolune altitudes for lunar orbit changes, but the Earth-Moon L1 and L3 points are fairly close to the Moon and provide significantly reduced delta-V requirements for apoapsis reflection maneuvers.

The apogee reflection maneuver can also be used to decrease the semi-major axis of an orbit if the smart propellant is initially ejected in the prograde direction. In this case, the relative ejection velocity will be slightly less than 0.414 $V_{circ}$ (the circular orbit velocity about the primary body at zero altitude) and the return velocity will be slightly less than 2.414 $V_{circ}$. Decreasing the semi-major axis can facilitate the generation of power on board the spacecraft by exploiting the fact that spacecraft orbital energy can be converted into electric power without the use of electrodynamic tethers or planetary magnetic fields. This technique can also be used to convert lunar orbital energy into electrical power for lunar settlements or even terrestrial use through microwave or photonic power-beaming.

The apogee reflection maneuver is not limited to circular spacecraft orbits and can therefore be used for general orbit-raising or lowering (as further discussed in the next section). In FIG. 19A, the spacecraft can eject more smart propellant at apogee in order to raise the perigee. This requires that the first ejected mass, and all subsequently-ejected masses, be ejected at the correct relative velocities, with modified apogee reflection thrusting, to include the additional orbit modifications between ejection and return. Unlike electrodynamic tethers, this technique does not require a local magnetic field and can therefore operate at any altitude.

The apogee reflection maneuver can also provide inclination changes to the host spacecraft if the smart propellant generates a plane-change maneuver at apogee. In this case, the delta-V requirement at apogee will be less than the in-plane or 180° reflection maneuver. The smart propellant will return with a significant velocity component perpendicular to the spacecraft orbit, thus imparting an orbit-plane changing impulse.

Orbit Raising or Lowering

The propulsion methods and systems described herein facilitate maneuvers that include orbit raising or lowering. For example, an orbit raising (or lowering) maneuver starts with ejecting propellant in the anti-flight (or flight) direction. The propellant returns to the spacecraft from the same direction in order to impart additional momentum, and hence impulse. FIGS. 20A-20E show a schematic sequence of an example orbit raising maneuver. Referring to FIG. 20A, in this example maneuver, a spacecraft is shown in initial circular orbit about a primary body with orbit velocity $V_o$. Referring to FIG. 20B, smart propellant is ejected in the anti-flight direction with enough speed to put it into a retrograde orbit with an apoapsis higher than the original orbit altitude. The relative ejection speed can be between $2V_o$ and $2.414V_o$, thus yielding $V_{Sp}$ in the primary body-centered inertial frame between $V_o$ and $1.414V_o$. The spacecraft receives an increase in velocity, thus injecting it into an elliptical orbit with higher energy. Referring to FIG. 20C, when the smart propellant reaches apoapsis at high altitude, its speed will be significantly lower than $V_o$ due to conservation of orbital angular momentum. Referring to FIG. 20D, the smart propellant is shown after an impulsive burn large enough to maintain its orbital speed, but in the reverse flight direction. The smart propellant is now in a posigrade orbit with a periapsis equal to the original orbit altitude. Referring to FIG. 20E, provided that the initial ejection velocity was chosen appropriately, the smart propellant and spacecraft will impact at periapsis. The spacecraft will receive an additional impulse from the smart propellant, thus raising its apogee even further resulting in the "Final Elliptical Spacecraft Orbit" (as denoted in FIG. 20). The relative impact velocity will range from 0 to $0.414V_o$. As previously discussed, at least a portion of the initial energy used to launch the smart propellant can be recovered by an appropriately-designed decelerator on the spacecraft.

Figure 21:
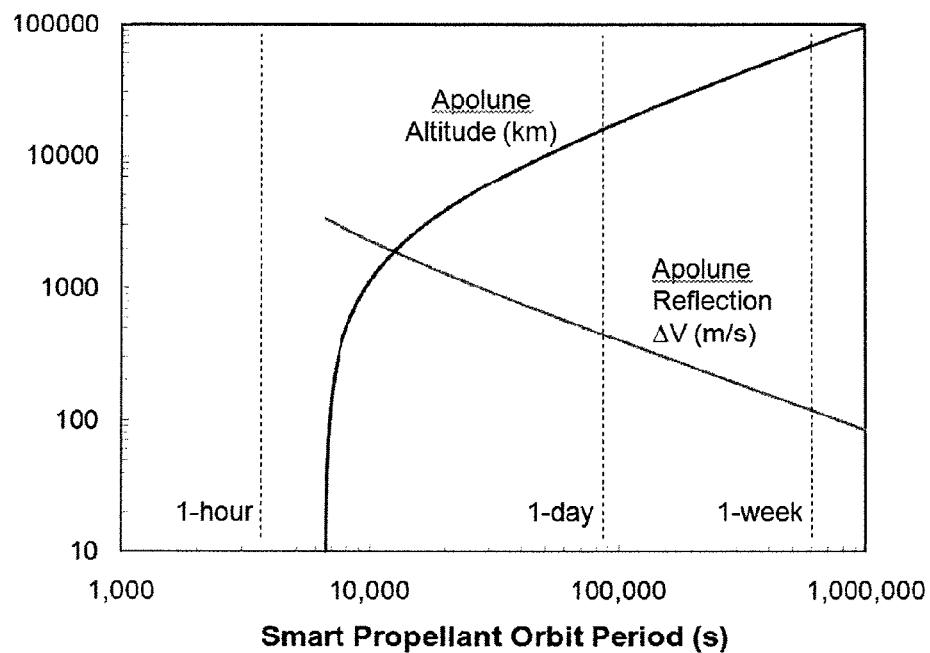
FIG. 21 is a plot showing smart propellant apolune altitude and apolune reflection delta-V as a function of smart propellant orbit period.

The apoapsis reflection maneuver in this example requires conventional thrusters on the smart propellant, and thus does not completely conserve smart propellant mass. However, the velocity increment required for apoapsis reflection can be much smaller than the original orbital velocity, thus saving significant propellant mass. FIG. 21 shows the smart propellant orbit period and apolune velocity change required for an initial orbit 1-km above the lunar surface. For an apolune of 40,000-km, the smart propellant returns in 79.9 hours and the required delta-V at apolune is 194-m/s.

Figure 22:
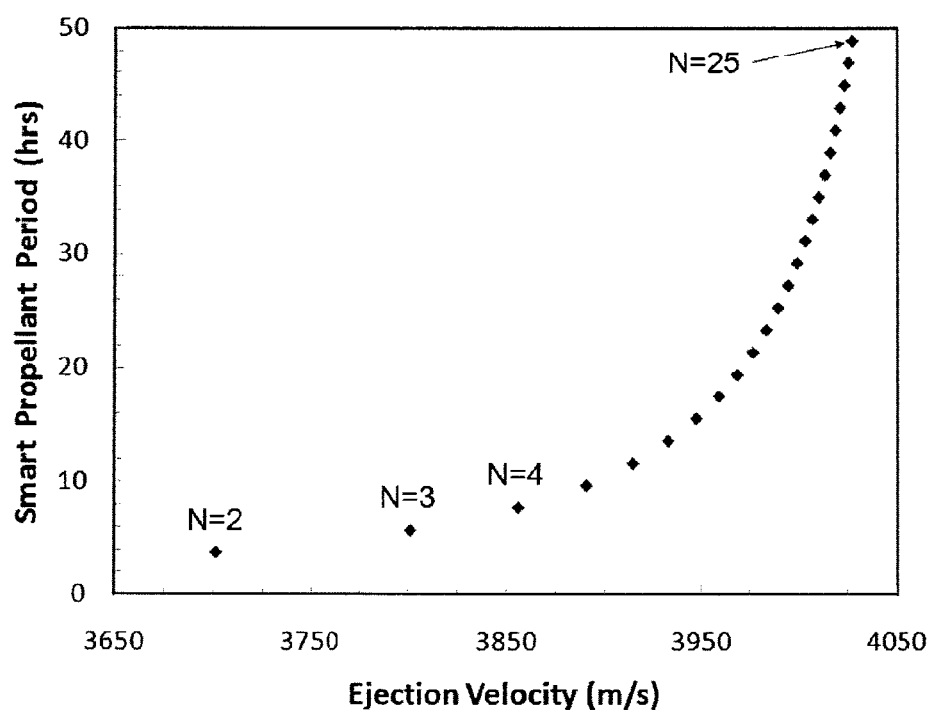
FIG. 22 is a plot showing smart propellant period vs. ejection velocity for orbit raising with a 1% smart propellant mass fraction in a 1-km altitude lunar orbit.

For a specific smart propellant mass fraction, ejection speeds are quantized. Smart propellant returns to the spacecraft after one smart propellant orbit period. The spacecraft, meanwhile, executes an integer number of orbits during this time in order to meet the returning smart propellant. FIG. 22 shows the smart propellant orbit period as a function of ejection velocity for a spacecraft in an initial orbit 1-km above the surface of the moon with a 1% smart propellant mass fraction. The different N values indicate how many orbits the spacecraft has performed before the smart propellant returns. For a 1% smart propellant mass fraction and N=25, the smart propellant apolune altitude is 27,050-km, the relative smart propellant ejection speed is 4027-m/s, and the spacecraft apolune increases by 176-km after initial ejection. The spacecraft gains another 12.5-km in apolune altitude when the smart propellant returns with a relative speed of 286-m/s from the anti-flight direction.

This process can be repeated at apolune to boost perilune, thus increasing the overall orbit radius with time. For orbit-lowering, smart propellant would be ejected in the flight direction at speeds between 0 and $0.414 V_o$, and it would return from the flight direction with speeds between $2V_o$ and $2.414V_o$. The smart propellant returns with additional kinetic energy due to the change in flight direction. Orbit-lowering with smart propellant converts spacecraft orbit energy into smart propellant kinetic energy. If smart propellant kinetic energy at recapture could be collected and stored at 100% efficiency, a spacecraft could start in high circular orbit, drop down to a lower circular orbit, and return to the original orbit altitude with no net energy usage.

Counter-Streaming Capture

In the counter-streaming capture technique, smart propellant is ejected from the host spacecraft far from the target body. The host spacecraft trajectory is designed to perform a free-return trajectory while the smart propellant is injected into a trajectory that intersects the free-return trajectory on the far side of the target.

Figure 23:
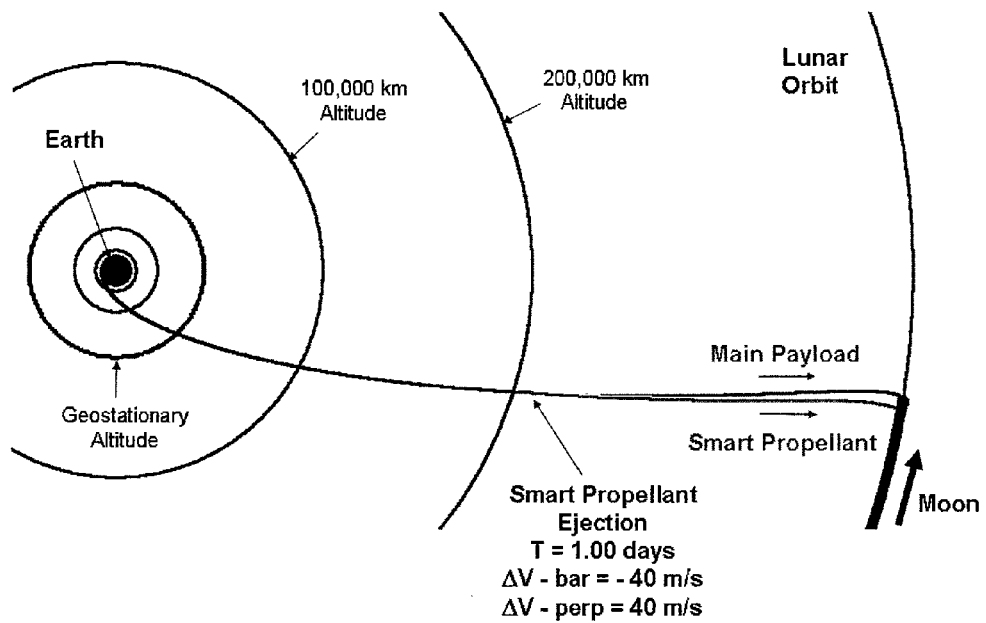
FIG. 23 shows an example of a counterstreaming capture trajectory for placing a Moon-bound spacecraft into lunar orbit.
Figure 24:
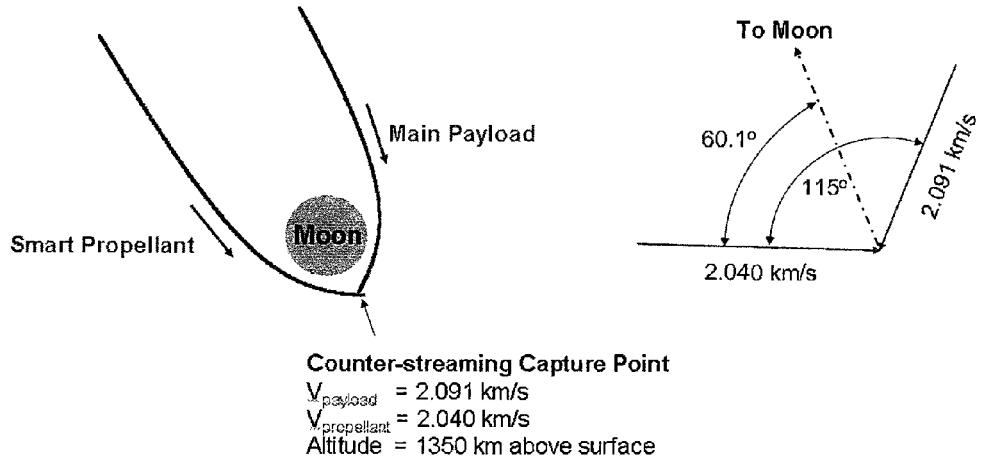
FIG. 24 shows the trajectory evolution of an example counter-streaming capture maneuver.

FIG. 23 shows an example of a counter-streaming capture trajectory for placing a Moon-bound spacecraft into lunar orbit. While traveling to the moon, the spacecraft ejects smart propellant, in this example of a counter-streaming capture maneuver, at 56.6 m/s at a 225° angle to the flight direction (−40 m/s in the flight direction and 40 m/s at a right angle to the flight direction) to place the main spacecraft on a free return trajectory that crosses lunar orbit in front of the Moon while the smart propellant crosses lunar orbit behind the Moon. Referring to FIG. 24, in a moon-centered reference frame, the Moon's gravity causes both trajectories to bend, and they intersect on the far side of the Moon. Proper choice of initial smart propellant mass ejection time and velocity can ensure that the spacecraft and propellant meet at the same point at the same time. In this example, recapture occurs at an altitude of 1350 km with a relative velocity of 3.48 km/s at an angle of 115°. If the total smart propellant mass is 15% of the original spacecraft plus propellant mass, recapture at the Moon will place the spacecraft plus propellant system into an elliptical orbit with an apolune of 22,000 km altitude and a perilune of 380 km altitude. In this example, insertion into lunar orbit has occurred without any significant propellant loss. A minor amount of propellant would be used by the smart propellant units for individual trajectory adjustments. The final spacecraft has received a significant amount of energy from the incoming smart propellant stream. This energy can be stored as electrical power for future use or radiated as heat.

Launch

Figure 25A:
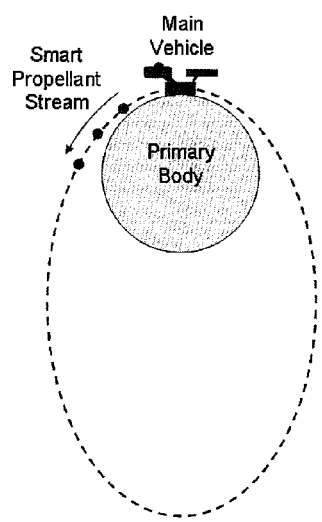
FIGS. 25A-25C show the trajectory evolution of an example launch maneuver.
Figure 25B:
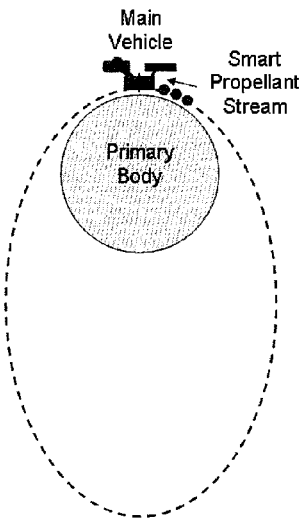
Figure 25C:
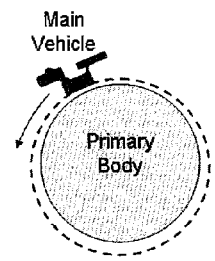

FIGS. 25A-25C show an example of a launch maneuver that can be facilitated utilizing the propulsion methods and systems described herein. In various examples of launch maneuvers, smart propellant is ejected horizontally, or near-horizontally, from a vehicle firmly anchored to an airless primary body such as a moon, asteroid, or planet. Referring to FIG. 25A, smart propellant is ejected into orbit around the primary body while the main vehicle is anchored to the surface. Referring to FIG. 25B, smart propellant is later recaptured when the vehicle is no longer anchored to the surface. In practice, the main vehicle will have to launch itself vertically above the local surface a short distance. The height will be a function of the main vehicle/smart mass stream mass ratio and the length of the smart mass stream at recapture. While the time required to recapture all of the ejected mass must be significantly shorter than the orbit period at zero altitude to avoid crashing back into the primary body, the launching period can be of arbitrary length. This is illustrated by the longer mass stream in FIG. 25A compared to that in FIG. 25B. Individual smart propellant masses can be put into different orbits with different orbital periods to provide stream bunching at periapsis. Multiple orbital periods between ejection and recovery can be accommodated using minor orbit corrections (initial periapsis raising to avoid collision with the main vehicle, followed by periapsis lowering during the final orbit). The use of stream bunching allows lower average power levels during the smart mass ejection phase. The smart mass ejection phase can be performed by the main vehicle or by a permanently fixed launcher station.

Smart masses can be launched into closed elliptical orbits, near-escape trajectories, or towards Lagrange points. For the simple case of ejection into elliptical orbits, conservation of momentum yields the required smart propellant/main vehicle mass fraction:

$$M_{sp}/M_{mv}=1/[(V_1/V_{circ})-1), \tag{10}$$

where $M_{sp}$ is the mass of ejected smart propellant, $M_{mv}$ is the mass of the main vehicle without ejected propellant, $V_1$ is the smart propellant ejection velocity, and $V_{circ}$ is the circular orbit velocity about the primary body at zero altitude. Equation (10) is valid for any primary body because it is independent of primary body mass. Ejection velocities larger than 1.414 $V_{circ}$ generate hyperbolic escape trajectories thus providing an upper limit on smart propellant ejection velocity. For the Moon, $V_{circ}$=1.19 km/s. The minimum mass of smart propellant required to enter circular orbit, using the example launch maneuver of FIGS. 25A-25C, is 2.4 times the mass of the main vehicle without smart propellant.

Figure 26A:
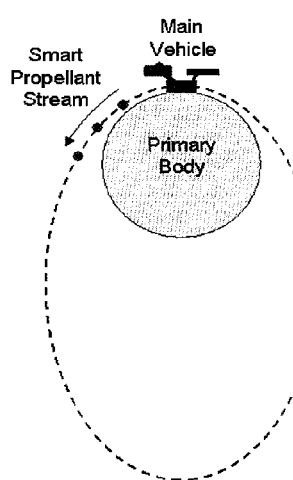
FIGS. 26A-26C show the trajectory evolution of an example launch and re-ejection maneuver.
Figure 26B:
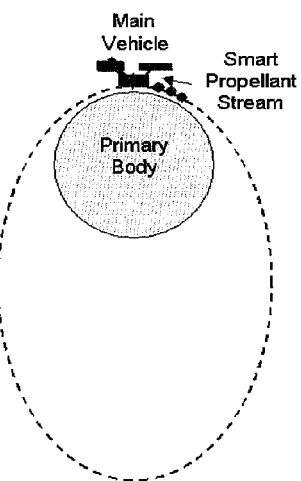
Figure 26C:
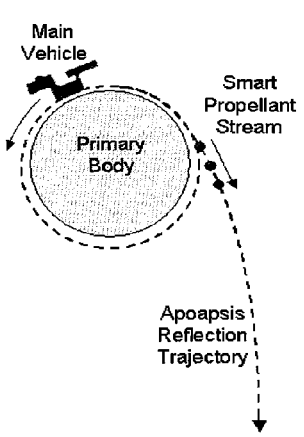

Referring to FIGS. 26A-26C, the launch maneuver can be executed in combination with other actions, such as the re-ejection of propellant mass. For example, smart propellant can be with re-ejected into apoapsis reflection trajectories to provide additional thrust at a later time for orbit raising and/or escape. Referring to FIG. 26C, in this example, the smart propellant is re-ejected from the main vehicle during or immediately after the propellant recovery phase, which significantly reduces the required mass of smart propellant.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A propulsion method, comprising:
ejecting a smart propellant device from a spacecraft resulting in an ejection force being imparted to the spacecraft; and
controlling the smart propellant device to return to the spacecraft.

2. The propulsion method of claim 1, wherein the smart propellant device is ejected while the spacecraft is orbiting a planet or moon.

3. The propulsion method of claim 1, wherein the smart propellant device is ejected while the spacecraft is in space or a substantially zero atmosphere environment.

4. The propulsion method of claim 1, wherein the smart propellant device is ejected while the spacecraft is traveling into or through outer space.

5. The propulsion method of claim 1, wherein the smart propellant device is ejected while the spacecraft is launching from an airless primary body.

6. The propulsion method of claim 1, wherein the smart propellant device is ejected in an anti-flight direction in relation to movement of the spacecraft.

7. The propulsion method of claim 6, wherein the smart propellant device is controlled to return to the spacecraft from the anti-flight direction.

8. The propulsion method of claim 1, wherein the smart propellant is ejected in a flight direction in relation to movement of the spacecraft.

9. The propulsion method of claim 8, wherein the smart propellant device is controlled to return to the spacecraft from the flight direction.

10. The propulsion method of claim 1, wherein the smart propellant device is controlled to return to the spacecraft after the spacecraft has completed an integer number of orbits.

11. The propulsion method of claim 1, wherein the ejection force reduces an orbital velocity of the spacecraft to approximately zero.

12. The propulsion method of claim 1, wherein the ejection force facilitates a maneuver by the spacecraft.

13. The propulsion method of claim 12, wherein the maneuver is facilitated exclusively utilizing smart propellant devices that are initially ejected from the spacecraft.

14. The propulsion method of claim 12, wherein the maneuver is facilitated without utilizing any forces imparted upon the spacecraft resulting from recovering, or recovering and ejecting, a propellant mass that was initially ejected or launched from a location other than the spacecraft.

15. The propulsion method of claim 12, wherein the maneuver includes injecting the spacecraft into or displacing the spacecraft from an orbit.

16. The propulsion method of claim 12, wherein the maneuver includes raising or lowering an orbit of the spacecraft.

17. The propulsion method of claim 12, wherein the maneuver includes deploying a thruster of the smart propellant device.

18. The propulsion method of claim 17, wherein the thruster of the smart propellant device is deployed to reverse a direction of movement of the smart propellant device.

19. The propulsion method of claim 17, wherein the thruster of the smart propellant device is deployed at or near apoapsis of the smart propellant device in relation to a gravitating body.

20. The propulsion method of claim 12, wherein the maneuver includes deploying a thruster of the spacecraft.

21. The propulsion method of claim 20, wherein the thruster of the spacecraft is deployed to reposition the spacecraft in relation to an airless primary body.

22. The propulsion method of claim 12, wherein the maneuver includes an apoapsis-reflection, orbit rephasing, or counter-streaming capture maneuver.

23. The propulsion method of claim 1, wherein ejecting the smart propellant device includes accelerating the smart propellant device to launch the smart propellant device from the spacecraft.

24. The propulsion method of claim 23, wherein the smart propellant device is accelerated using a mechanical, pneumatic, or electromagnetic device.

25. The propulsion method of claim 23, wherein the smart propellant device is accelerated using a spring.

26. The propulsion method of claim 1, wherein the smart propellant device is ejected at a velocity that causes the smart propellant device and the spacecraft to subsequently be in the same place at the same time.

27. The propulsion method of claim 1, wherein controlling the smart propellant device includes responding to commands generated by the smart propellant device.

28. The propulsion method of claim 27, wherein the commands include guidance control commands for controlling movement of the smart propellant device.

29. The propulsion method of claim 1, wherein controlling the smart propellant device includes controlling the smart propellant device to travel along a trajectory.

30. The propulsion method of claim 29, wherein the trajectory is at least initially elliptical in shape.

31. The propulsion method of claim 29, wherein controlling the smart propellant device includes modifying the trajectory.

32. The propulsion method of claim 31, wherein the trajectory is modified in consideration of a position determination made by the smart propellant device.

33. The propulsion method of claim 32, wherein the position determination is made utilizing a Global Positioning System (GPS) or an optical sensor.

34. The propulsion method of claim 32, wherein the position determination is made utilizing a Carrier-phase Differential Global Positioning System (CDGPS) technique.

35. The propulsion method of claim 32, wherein the position determination is made during a terminal guidance phase of the trajectory.

36. The propulsion method of claim 1, further comprising:
recovering the smart propellant device at the spacecraft resulting in a recovery force being imparted to the spacecraft.

37. The propulsion method of claim 36, wherein the ejection force results in a first impulse to the spacecraft that changes an orbit of the spacecraft, and the recovery force results in a second impulse to the spacecraft that further changes the orbit.

38. The propulsion method of claim 36, wherein the smart propellant device is ejected at an ejection velocity and is controlled to impact the spacecraft at a return velocity that is approximately equal to the ejection velocity.

39. The propulsion method of claim 36, wherein the smart propellant device is recovered while the spacecraft is orbiting a planet or moon.

40. The propulsion method of claim 36, wherein the smart propellant device is recovered while the spacecraft is in space or a substantially zero atmosphere environment.

41. The propulsion method of claim 36, wherein the smart propellant device is recovered while the spacecraft is traveling into or through outer space.

42. The propulsion method of claim 36, wherein the smart propellant device is recovered after the spacecraft has been launching from an airless primary body.

43. The propulsion method of claim 36, wherein the recovery force facilitates a maneuver by the spacecraft.

44. The propulsion method of claim 43, wherein the maneuver is facilitated exclusively utilizing smart propellant devices that are initially ejected from the spacecraft.

45. The propulsion method of claim 43, wherein the maneuver is facilitated without utilizing any forces imparted upon the spacecraft resulting from recovering, or recovering and ejecting, a propellant mass that was initially ejected or launched from a location other than the spacecraft.

46. The propulsion method of claim 43, wherein the maneuver includes injecting the spacecraft into or displacing the spacecraft from an orbit.

47. The propulsion method of claim 43, wherein the maneuver includes raising or lowering an orbit of the spacecraft.

48. The propulsion method of claim 43, wherein the maneuver includes deploying a thruster of the smart propellant device.

49. The propulsion method of claim 48, wherein the thruster of the smart propellant device is deployed to reverse a direction of movement of the smart propellant device.

50. The propulsion method of claim 48, wherein the thruster of the smart propellant device is deployed at or near apoapsis of the smart propellant device in relation to a gravitating body.

51. The propulsion method of claim 43, wherein the maneuver includes deploying a thruster of the spacecraft.

52. The propulsion method of claim 51, wherein the thruster of the spacecraft is deployed to reposition the spacecraft in relation to an airless primary body.

53. The propulsion method of claim 43, wherein the maneuver includes an apoapsis-reflection, orbit rephasing, or counter-streaming capture maneuver.

54. The propulsion method of claim 36, wherein recovering the smart propellant device includes decelerating the smart propellant device when the smart propellant device impacts the spacecraft.

55. The propulsion method of claim 54, wherein the smart propellant device is decelerated using a mechanical, pneumatic, or electromagnetic device.

56. The propulsion method of claim 54, wherein the smart propellant device is decelerated using a spring.

57. The propulsion method of claim 54, wherein recovering the smart propellant device further includes capturing the incoming kinetic energy of the smart propellant device.

58. The propulsion method of claim 57, wherein the incoming kinetic energy is captured using a spring and a mechanically-operated power generator, which is operationally engaged in response to compression of the spring.

59. The propulsion method of claim 57, wherein the incoming kinetic energy is captured using an electromagnetic device configured to operate as a power generator.

60. The propulsion method of claim 36, further comprising:
re-ejecting the smart propellant device from the spacecraft resulting in an additional ejection force being imparted to the spacecraft;
controlling the smart propellant device to again return to the spacecraft; and
re-recovering the smart propellant device at the spacecraft resulting in an additional recovery force being imparted to the spacecraft.

61. A propulsion method, comprising:
ejecting a plurality of smart propellant devices from a spacecraft resulting in one or more ejection forces being imparted to the spacecraft; and
controlling the smart propellant devices to return to the spacecraft.

62. The propulsion method of claim 61, wherein the smart propellant devices are sequentially ejected.

63. The propulsion method of claim 61, wherein the smart propellant devices are ejected at different velocities.

64. The propulsion method of claim 61, wherein the smart propellant devices are put into different orbits.

65. The propulsion method of claim 61, wherein the one or more ejection forces facilitate a maneuver by the spacecraft.

66. The propulsion method of claim 65, wherein the maneuver is facilitated exclusively utilizing smart propellant devices that are initially ejected from the spacecraft.

67. The propulsion method of claim 65, wherein the maneuver is facilitated without utilizing any forces imparted upon the spacecraft resulting from recovering, or recovering and ejecting, a propellant mass that was initially ejected or launched from a location other than the spacecraft.

68. The propulsion method of claim 61, further comprising:
recovering one or more of the smart propellant devices at the spacecraft resulting in one or more recovery forces being imparted to the spacecraft.

69. The propulsion method of claim 68, wherein the one or more recovery forces facilitate a maneuver by the spacecraft.

70. The propulsion method of claim 69, wherein the maneuver is facilitated exclusively utilizing smart propellant devices that are initially ejected from the spacecraft.

71. The propulsion method of claim 69, wherein the maneuver is facilitated without utilizing any forces imparted upon the spacecraft resulting from recovering, or recovering and ejecting, a propellant mass that was initially ejected or launched from a location other than the spacecraft.

72. The propulsion method of claim 68, wherein recovering one or more of the smart propellant devices includes decelerating one or more of the smart propellant devices when the one or more smart propellant devices impact the spacecraft.

73. The propulsion method of claim 72, wherein recovering one or more of the smart propellant devices further includes capturing the incoming kinetic energy of the one or more smart propellant devices.

74. The propulsion method of claim 72, further comprising:
re-ejecting at least one of the one or more smart propellant devices that were recovered resulting in one or more additional ejection forces being imparted to the spacecraft;
controlling the one or more smart propellant devices to again return to the spacecraft; and
re-recovering at least one of the one or more smart propellant devices at the spacecraft resulting in one or more additional recovery forces being imparted to the spacecraft.

75. A propulsion method, comprising:
(a) ejecting one or more smart propellant devices from a spacecraft;
(b) controlling the one or more smart propellant devices to return at least one of the one or more smart propellant devices to the spacecraft;
(c) recovering one or more returning smart propellant devices; and
(d) repeating (a)-(c) until forces resulting from (a) and (c), that in the aggregate facilitate a maneuver of the spacecraft, have been imparted to the spacecraft, or until the maneuver is completed or aborted.

76. The propulsion method of claim 75, wherein the maneuver is facilitated exclusively utilizing smart propellant devices that are initially ejected from the spacecraft.

77. The propulsion method of claim 75, wherein the maneuver is facilitated without utilizing any forces imparted upon the spacecraft resulting from recovering, or recovering and ejecting, a propellant mass that was initially ejected or launched from a location other than the spacecraft.

* * * * *